(12) United States Patent
Shelton et al.

(10) Patent No.: US 6,779,067 B2
(45) Date of Patent: Aug. 17, 2004

(54) METHOD AND APPARATUS FOR PROVIDING EXTENDED FUNCTIONALITY FOR A BUS

(75) Inventors: Todd R. Shelton, Syracuse, UT (US);
Theodore J. Smith, Layton, UT (US);
Marvin R. DeForest, Niwot, CO (US);
Kelly D. Wright, Layton, UT (US);
Mark L. Reimann, Layton, UT (US);
Hiromichi Oribe, Clearfield, UT (US);
Jeffery D. Penman, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 536 days.

(21) Appl. No.: 09/855,993

(22) Filed: May 14, 2001

(65) Prior Publication Data

US 2002/0169911 A1 Nov. 14, 2002

(51) Int. Cl.[7] .............................................. G06F 13/00
(52) U.S. Cl. ........................ 710/300; 710/316; 711/115
(58) Field of Search .......................... 710/2, 8, 13, 14, 710/38, 72, 74, 100, 300, 301–304, 305, 306, 313, 316; 360/69; 361/684–686; 711/100, 111, 112, 115

(56) References Cited

U.S. PATENT DOCUMENTS

| | | | |
|---|---|---|---|
| 2,278,280 A | 3/1942 | Pfeiffer et al. | |
| 2,896,833 A | 7/1959 | Markham | |
| 3,144,236 A | 8/1964 | Clanin | |

(List continued on next page.)

FOREIGN PATENT DOCUMENTS

| | | | |
|---|---|---|---|
| DE | 41 10 399 A1 | 10/1992 | |
| DE | 43 04 506 | 8/1994 | |
| EP | 0 204 299 | 12/1986 | |
| EP | 0 210 497 | 2/1987 | |
| EP | 0 335 490 | 10/1989 | |
| EP | 0 426 414 | 5/1991 | |
| EP | 1049325 A2 * | 11/2000 | ............ H04N/5/00 |
| FR | 2 691 435 | 11/1993 | |
| GB | 2 228 819 | 9/1990 | |
| GB | 2 243 940 | 11/1991 | |
| JP | 62-259284 | 11/1987 | |
| JP | 1-189091 | 7/1989 | |
| JP | 06-236669 | 8/1994 | |
| JP | 2000099217 | 7/2000 | |
| WO | WO 93/24932 | 12/1993 | |
| WO | WO 99/06902 | 2/1999 | |

OTHER PUBLICATIONS

"IBM Travelstar E—External Hard Disk Drive—Installation and Operation Guide", IBM Storage Systems Division, San Jose, California, 2000, 10 sheets.

Thomas A. Wilke, U.S. patent application Ser. No. 09/590,508 filed Jun. 9, 2000.

Thomas A. Wilke, U.S. patent application Ser. No. 09/591,081 filed Jun. 9, 2000.

(List continued on next page.)

Primary Examiner—Xuan Thai
(74) Attorney, Agent, or Firm—Haynes and Boone, LLP

(57) ABSTRACT

An information storage device (10) includes a cartridge (14) removably inserted into a cradle (13) that has a drive module (18) releasably coupled to an interface module (17). A drive electronics circuit (71) in the drive module is coupled to a hard disk drive mechanism (56) in the cartridge, and is coupled through a bus switch (131) and a bus (122) to a bridge circuit (111) in the interface module. An auxiliary circuit (76) in the drive module is coupled to the bus, is controlled by the bridge circuit, operates the bus switch, and handles considerations relating to removability of the cartridge. The interface module is one of several interchangable interface modules which each have a different bridge circuit to interface the bus to a respective different communication protocol.

26 Claims, 7 Drawing Sheets

U.S. PATENT DOCUMENTS

| | | |
|---|---|---|
| 3,692,264 A | 9/1972 | Burkhard et al. |
| 3,695,421 A | 10/1972 | Wood |
| 4,061,228 A | 12/1977 | Johnson |
| 4,062,049 A | 12/1977 | Dirks |
| 4,359,762 A | 11/1982 | Stollorz |
| 4,414,576 A | 11/1983 | Randmae |
| 4,507,689 A | 3/1985 | Kozuki |
| 4,527,262 A | 7/1985 | Manto |
| 4,550,343 A | 10/1985 | Nakatani |
| 4,562,500 A | 12/1985 | Bygdnes |
| 4,622,607 A | 11/1986 | Smith, II |
| 4,639,863 A | 1/1987 | Harrison et al. |
| 4,683,520 A | 7/1987 | Grassens et al. |
| 4,688,206 A | 8/1987 | Nakagawa et al. |
| 4,705,257 A | 11/1987 | Leo et al. |
| 4,709,817 A | 12/1987 | Keady |
| 4,712,146 A | 12/1987 | Moon |
| 4,724,500 A | 2/1988 | Dalziel |
| 4,749,164 A | 6/1988 | Leo et al. |
| 4,754,397 A | 6/1988 | Varaiya et al. |
| 4,763,225 A | 8/1988 | Frenkel et al. |
| 4,769,764 A | 9/1988 | Levanon |
| 4,791,511 A | 12/1988 | Davis |
| 4,806,106 A | 2/1989 | Mebane |
| 4,833,554 A | 5/1989 | Dalziel et al. |
| 4,853,807 A | 8/1989 | Trager |
| 4,856,656 A | 8/1989 | Sugimoto et al. |
| 4,869,369 A | 9/1989 | Turngren |
| 4,884,261 A | 11/1989 | Dalziel |
| 4,893,210 A | 1/1990 | Mintzlaff |
| 4,893,263 A | 1/1990 | Myers |
| 4,896,777 A | 1/1990 | Lewis |
| 4,908,715 A | 3/1990 | Krum |
| 4,926,291 A | 5/1990 | Sarraf |
| 4,937,806 A | 6/1990 | Babson et al. |
| 4,965,691 A | 10/1990 | Iftikar et al. |
| 4,974,103 A | 11/1990 | Iftikar et al. |
| 5,002,368 A | 3/1991 | Anglin |
| 5,004,207 A | 4/1991 | Ishikawa et al. |
| 5,024,328 A | 6/1991 | Bontrager |
| 5,025,335 A | 6/1991 | Stefansky |
| 5,041,924 A | 8/1991 | Blackborow et al. |
| 5,065,262 A | 11/1991 | Blackborow |
| 5,084,791 A | 1/1992 | Thanos |
| 5,126,890 A | 6/1992 | Wade et al. |
| 5,128,830 A | 7/1992 | Deluca et al. |
| 5,160,473 A | 11/1992 | Bontrager |
| 5,170,300 A | 12/1992 | Stefansky |
| 5,175,657 A | 12/1992 | Iftikar et al. |
| 5,204,794 A | 4/1993 | Yoshida |
| 5,207,327 A | 5/1993 | Brondos |
| 5,208,712 A | 5/1993 | Hatch et al. |
| 5,214,550 A | 5/1993 | Chan |
| 5,223,996 A | 6/1993 | Read et al. |
| 5,235,481 A | 8/1993 | Kamo et al. |
| 5,241,436 A | 8/1993 | Kawabata |
| 5,243,485 A | 9/1993 | Weiley |
| H1245 H | 10/1993 | Griswold et al. |
| 5,253,129 A | 10/1993 | Blackborow et al. |
| 5,258,888 A | 11/1993 | Korinsky |
| 5,303,101 A | 4/1994 | Hatch et al. |
| 5,317,464 A | 5/1994 | Witt et al. |
| 5,359,504 A | 10/1994 | Ohmi et al. |
| 5,363,227 A | 11/1994 | Ichikawa et al. |
| 5,363,276 A | 11/1994 | Crockett |
| 5,372,515 A | 12/1994 | Miller et al. |
| 5,392,197 A | 2/1995 | Cuntz et al. |
| 5,400,196 A | 3/1995 | Moser et al. |
| 5,400,389 A | 3/1995 | Niiyama et al. |
| 5,402,308 A | 3/1995 | Koyanagi et al. |
| 5,408,383 A | 4/1995 | Nagasaka et al. |
| 5,412,522 A | 5/1995 | Lockhart et al. |
| 5,426,562 A | 6/1995 | Morehouse et al. |
| 5,436,857 A | 7/1995 | Nelson et al. |
| 5,438,162 A | 8/1995 | Thompson et al. |
| 5,444,586 A | 8/1995 | Iftikar et al. |
| 5,448,433 A | 9/1995 | Morehouse |
| 5,452,159 A | 9/1995 | Stefansky |
| 5,454,080 A | 9/1995 | Fasig et al. |
| 5,463,527 A | 10/1995 | Hager et al. |
| 5,477,401 A | 12/1995 | Squires et al. |
| 5,479,285 A | 12/1995 | Burke |
| 5,502,604 A | 3/1996 | Furay |
| 5,532,889 A | 7/1996 | Stefansky |
| 5,532,891 A | 7/1996 | Tsujino |
| 5,550,712 A | 8/1996 | Crockett |
| 5,585,986 A | 12/1996 | Parkin |
| 5,615,070 A | 3/1997 | Bordes |
| 5,631,788 A | 5/1997 | Richards |
| 5,644,454 A | 7/1997 | Arya et al. |
| 5,663,855 A | 9/1997 | Kim et al. |
| 5,715,169 A | 2/1998 | Noguchi |
| 5,724,216 A | 3/1998 | Iftikar et al. |
| 5,727,170 A | 3/1998 | Mitchell et al. |
| 5,734,860 A | 3/1998 | Kondo |
| 5,739,995 A | 4/1998 | Ohmi et al. |
| 5,754,357 A | 5/1998 | Anderson et al. |
| 5,793,207 A | 8/1998 | Gill |
| 5,808,830 A | 9/1998 | Stefansky et al. |
| 5,808,866 A | 9/1998 | Porter |
| 5,809,520 A | 9/1998 | Edwards et al. |
| 5,812,373 A | 9/1998 | Hwang |
| 5,818,029 A | 10/1998 | Thomson |
| 5,831,788 A | 11/1998 | Hofland |
| 5,837,934 A | 11/1998 | Valavanis et al. |
| 5,841,605 A | 11/1998 | Foster et al. |
| 5,872,669 A | 2/1999 | Morehouse et al. |
| 5,928,347 A | 7/1999 | Jones |
| 5,940,629 A * | 8/1999 | Rikukawa et al. ............ 710/62 |
| 5,943,193 A | 8/1999 | Thayne et al. |
| 5,943,208 A | 8/1999 | Kato et al. |
| 5,949,630 A | 9/1999 | Yamamoto et al. |
| 5,969,901 A | 10/1999 | Eckberg et al. |
| 5,986,991 A | 11/1999 | Kawahara et al. |
| 5,995,365 A | 11/1999 | Broder et al. |
| 5,999,406 A | 12/1999 | McKain et al. |
| 6,021,029 A | 2/2000 | Mamiya et al. |
| 6,025,973 A | 2/2000 | Mizoshita et al. |
| 6,028,744 A | 2/2000 | Amirkiai et al. |
| 6,082,543 A | 7/2000 | Béliveau |
| 6,088,312 A | 7/2000 | Utsumi |
| 6,119,183 A * | 9/2000 | Briel et al. ................ 710/316 |
| 6,128,670 A | 10/2000 | Hashimoto et al. |
| 6,131,141 A * | 10/2000 | Ravid ....................... 711/112 |
| 6,144,552 A | 11/2000 | Whitcher et al. |
| 6,154,330 A | 11/2000 | Nakagawa |
| 6,154,360 A | 11/2000 | Kaczeus, Sr. et al. |
| 6,166,901 A | 12/2000 | Gamble et al. |
| 6,185,069 B1 | 2/2001 | Schick |
| 6,201,771 B1 | 3/2001 | Otsuka et al. |
| 6,230,074 B1 | 5/2001 | Shinkai |
| 6,252,744 B1 | 6/2001 | Kelemen |
| 6,259,573 B1 | 7/2001 | Tsuwako et al. |
| 6,266,724 B1 | 7/2001 | Harari et al. |
| 6,285,092 B1 | 9/2001 | Kawahara et al. |
| 6,298,016 B1 | 10/2001 | Otsuka |
| 6,301,087 B1 | 10/2001 | Combe |
| 6,304,440 B1 | 10/2001 | Lin |
| 6,320,744 B1 | 11/2001 | Sullivan et al. |
| 6,324,054 B1 | 11/2001 | Chee et al. |
| 6,353,870 B1 | 3/2002 | Mills et al. |

| | | | |
|---|---|---|---|
| 6,374,315 B1 | | 4/2002 | Okada et al. |
| 6,378,028 B2 | * | 4/2002 | Inagawa et al. ............ 710/316 |
| 6,386,979 B1 | | 5/2002 | Ho et al. |
| 6,388,591 B1 | | 5/2002 | Ng |
| 6,496,362 B2 | * | 12/2002 | Osterhout et al. .......... 361/685 |
| 6,496,979 B1 | | 12/2002 | Chen et al. |
| 6,501,612 B1 | | 12/2002 | Kato et al. |
| 6,510,485 B1 | | 1/2003 | Shin |
| 6,519,669 B1 | * | 2/2003 | Yanagisawa ................ 710/304 |
| 6,564,290 B1 | | 5/2003 | Lechner |
| 6,566,838 B2 | | 5/2003 | Maiocchi |
| 6,570,728 B2 | | 5/2003 | Iizuka et al. |
| 6,574,058 B1 | | 6/2003 | Aruga et al. |
| 6,587,300 B1 | | 7/2003 | Dobbek |
| 6,601,129 B1 | * | 7/2003 | Arakeri et al. .............. 710/316 |
| 6,624,979 B1 | * | 9/2003 | Wilke et al. ............. 360/256.2 |
| 6,628,474 B1 | * | 9/2003 | Penman et al. .......... 360/97.02 |
| 6,633,445 B1 | * | 10/2003 | Wilke .......................... 360/55 |
| 2002/0042152 A1 | | 4/2002 | Yamazaki et al. |
| 2002/0044416 A1 | | 4/2002 | Harmon, III et al. |
| 2002/0085300 A1 | * | 7/2002 | Bracken et al. ................ 360/69 |
| 2002/0118480 A1 | * | 8/2002 | Rochat et al. ................ 360/69 |

OTHER PUBLICATIONS

Thomas A. Wilke, Allen T. Bracken, U.S. patent application Ser. No. 09/591,354 filed Jun. 9, 2000.

Thomas A. Wilke, Allen T. Bracken, Brent J. Watson, Fred C. Thomas III, U.S. patent application Ser. No. 09/591,074 filed Jun. 9, 2000.

Thomas A. Wilke, Marvin R. DeForest, Dennis D. Ogden, U.S. patent application Ser. No. 09/591,540 filed Jun. 9, 2000.

Allen T. Bracken, Mark L. Reimann, Theodore J. Smith, U.S. patent application Ser. No. 09/591,538 filed Jun. 9, 2000.

Jeffery D. Penman, Todd R. Shelton, U.S. patent application Ser. No. 09/590,509 filed Jun. 9, 2000.

Randall C. Bauck, U.S. patent application Ser. No. 09/590,498 filed Jun. 9, 2000.

Randall C. Bauck, Allen T. Bracken, Thomas A. Wilke, David S. Greenhalgh, U.S. patent application Ser. No. 09/590,511 filed Jun. 9, 2000.

Daniel D. Rochat, Mark L. Reimann, Allen T. Bracken, U.S. patent application Ser. No. 09/74,6304 filed Dec. 21, 2000.

Allen T. Bracken, Theodore J. Smith, Jeffery D. Penman, Todd R. Shelton, David S. Greenhalgh; Paul E. Jacobs, Spencer W. Stout, Paul C. Kunz, Scott P. Thomas, Douglas S. Reynolds, David L. Jolley, Ryan D. Osterhout, U.S. patent application Ser. No. 09/755,961 filed Jan. 4, 2001.

Paul C. Kunz, U.S. patent application Ser. No. 09/854,354, filed May 11, 2001.

Paul C. Kunz, Ryan D. Osterhout, Theodore J. Smith, Spencer W. Stout, Scott P. Thomas, U.S. patent application Ser. No. 09/854,391 filed May 11, 2001.

Fred C. Thomas III, U.S. patent application Ser. No. 09/839,515, filed Apr. 20, 2001.

Ryan D. Osterhout, Scott P. Thomas, Paul C. Kunz, Allen T. Bracken, U.S. patent application Ser. No. 09/858,073, filed May 14, 2001.

William P. Baker, Todd R. Shelton, Theodore J. Smith, U.S. patent application Ser. No. 09/866,568 filed May 25, 2001.

* cited by examiner

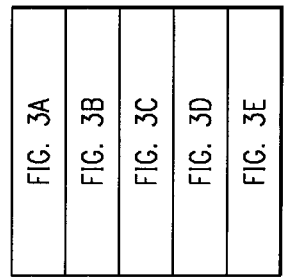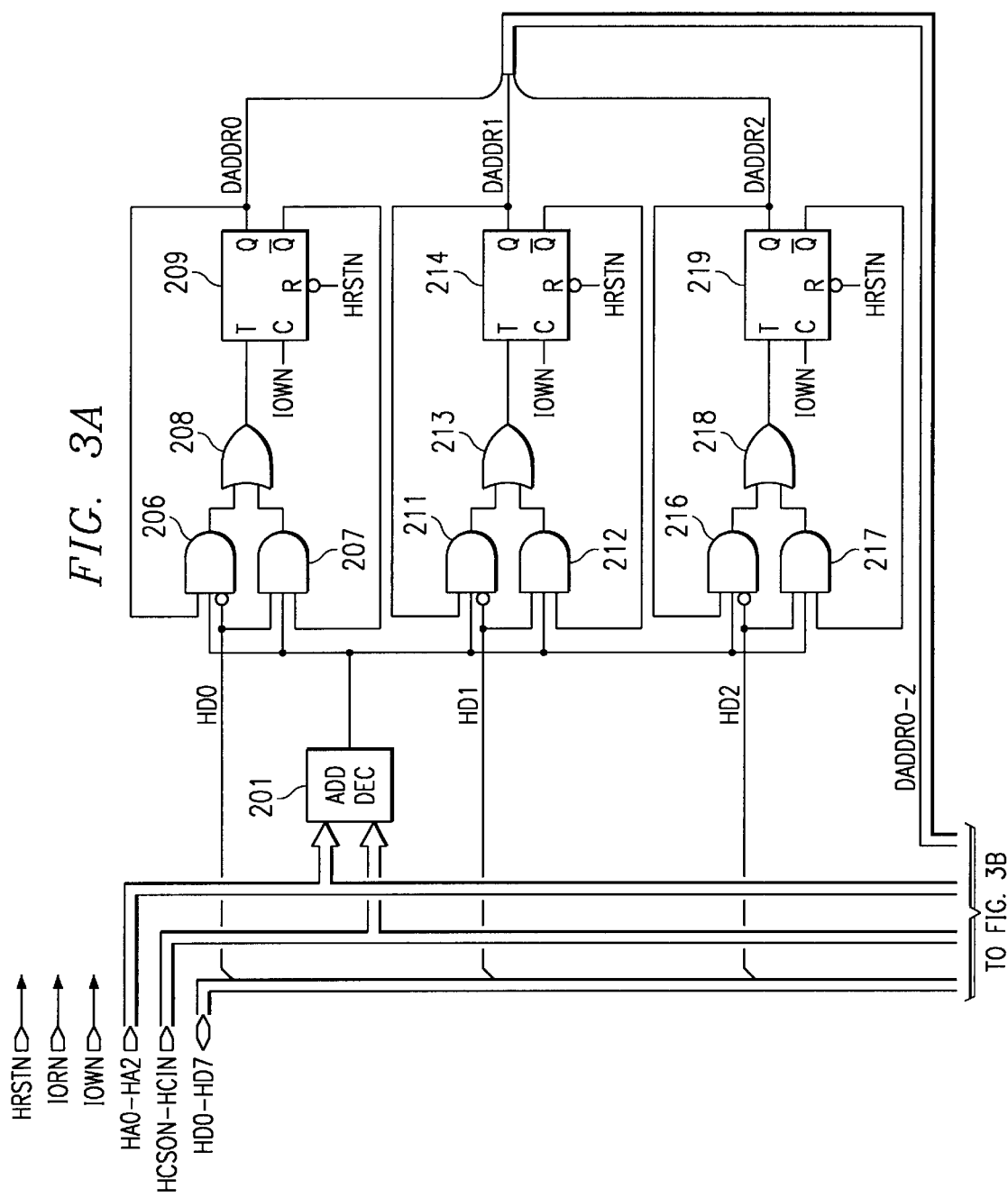

METHOD AND APPARATUS FOR PROVIDING EXTENDED FUNCTIONALITY FOR A BUS

TECHNICAL FIELD OF THE INVENTION

This invention relates in general to an information storage device and, more particularly, to an information storage device in which a cartridge containing a storage media can be removably inserted into a cradle.

BACKGROUND OF THE INVENTION

Over the past twenty years, computer technology has evolved very rapidly. One aspect of this evolution has been a progressively growing demand for increased storage capacity in memory devices, especially where the information storage medium is disposed in some form of removable cartridge. In this regard, just a little over a decade ago, the typical personal computer had a floppy disk drive which accepted floppy disk cartridges that contained a 5.25-inch disk with a storage capacity up to about 720 KB per cartridge. Not long thereafter, these devices gave way to a new generation of floppy disk drives, which accepted smaller floppy disk cartridges each containing a 3.5-inch disk having a higher storage capacity of about 1.44 MB per cartridge.

Subsequently, as the evolution continued, a further significant increase in storage capacity was realized in the industry by the introduction of a storage system having removable cartridges containing floppy-type disks with storage capacities on the order of 100 MB to 250 MB. Systems of this type are commercially available under the tradename ZIP from Iomega Corporation of Roy, Utah, which is the assignee of the present application. Thereafter, another significant increase in storage capacity was realized by the introduction of a system having removable cartridges with storage capacities on the order of 1 GB to 2 GB. Systems of this type are also available from Iomega Corporation, under the tradename JAZ. These two products have each enjoyed immense commercial success. Nevertheless, the demand for still greater storage capacities in removable cartridges continues to progressively increase, such that there is a current demand for cartridges capable of storing 5 GB to 20 GB, or even more.

The types of removable cartridges discussed above each contain a rotatably supported storage medium within an unsealed housing. The read/write heads, with associated circuitry and support structure, are in the drive rather than in the cartridge. Significantly higher storage capacities exist in hard disk technology of the type used in non-removable hard disk drives, where the disk and head are both disposed within a sealed housing. However, there are problems involved in attempting to carry use of this technology over to removable cartridges. This is due in part to the fact that a high-capacity hard disk is highly sensitivity to environmental factors such as dust and static electricity. Consequently, in order to achieve high storage densities, the sealed housing is needed for the hard disk itself, as well for some associated components (such as the read/write heads) that must be within the sealed housing and thus within the cartridge.

A further consideration is that a drive electronics circuit is typically mounted to the outside of the sealed housing of a hard disk drive, and contains a relatively complex and sophisticated circuit that controls the hard disk drive structure within the sealed housing. Where a hard disk drive mechanism is incorporated into a removable cartridge, it is desirable that the drive electronics circuit be implemented in the cradle which receives the cartridge, in order to avoid adding the cost of this circuit to the price of every cartridge. Further, it is desirable that the cradle use a pre-existing and commercially available drive electronics circuit, rather than a custom circuit designed specifically for the cradle. However, pre-existing drive electronics circuits have designs which reflect the expectation that they will be physically and electrically coupled at all times to the hard disk drive mechanism. They do not have the capability to deal with various considerations which arise as a result of the fact that the cartridge with the hard disk drive mechanism is removable from the cradle.

Still another consideration is that different users will wish to couple the cradle to various different types of standard computer interfaces. Various bridge circuits are commercially available to provide an interface between the communication protocol used to interact with the drive electronics circuit of a standard hard disk drive, and a respective one of several different communication protocols used to interface peripheral devices to computers. It would be desirable to be able to provide a cradle which can accept any one of these bridge circuits with little or no change in other circuitry of the cradle. Further, it would be desirable to use hardware of the bridge circuit to handle some or all of the considerations relating to removability of the cartridge.

Unfortunately, the hardware of these bridge circuits tends to vary significantly from one type of bridge circuit to another type of bridge circuit. Although some have spare outputs that might possibly be useful in handling at least some of the considerations relating to removability, others have no such spare outputs. In any event, the hardware differences among these various types of bridge circuits are such that there is no straightforward way to define a standardized approach to use of hardware of these bridge circuits to handle removability considerations.

Still another consideration is that some existing drive electronics circuits occasionally carry out commands that take a relatively long period of time, such as formatting of a hard disk, and tend to tie up an associated bus throughout the duration of the command. Considerations relating to removability may present issues that should be dealt with during the long command, but which cannot be handled using the bus if it is tied up by the drive electronics circuit.

SUMMARY OF THE INVENTION

According to one form of the present invention, a method and apparatus are provided and involve a cartridge having a data storage section and a first coupling portion operatively coupled to the data storage section, and a receiving section having a cartridge receiving portion which can removably receive the cartridge. The receiving section includes: a first control circuit; a bus controlled by the first control circuit; a second control circuit; a second coupling portion operatively coupled to the second control circuit and positioned so that the second control circuit can communicate with the data storage section through the first and second coupling portions when the cartridge is removably received in the cartridge receiving portion; a bus switch operatively coupled between the bus and the second control circuit, the switch having first and second operational modes in which the switch respectively effects and inhibits an operative coupling of the second control circuit to the bus; and an auxiliary circuit operatively coupled to the bus and to the bus switch, the auxiliary circuit being responsive to switch control information received from the first control circuit through the bus for causing the switch to operate in a selected one of the first and second operational modes specified by the switch control information.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
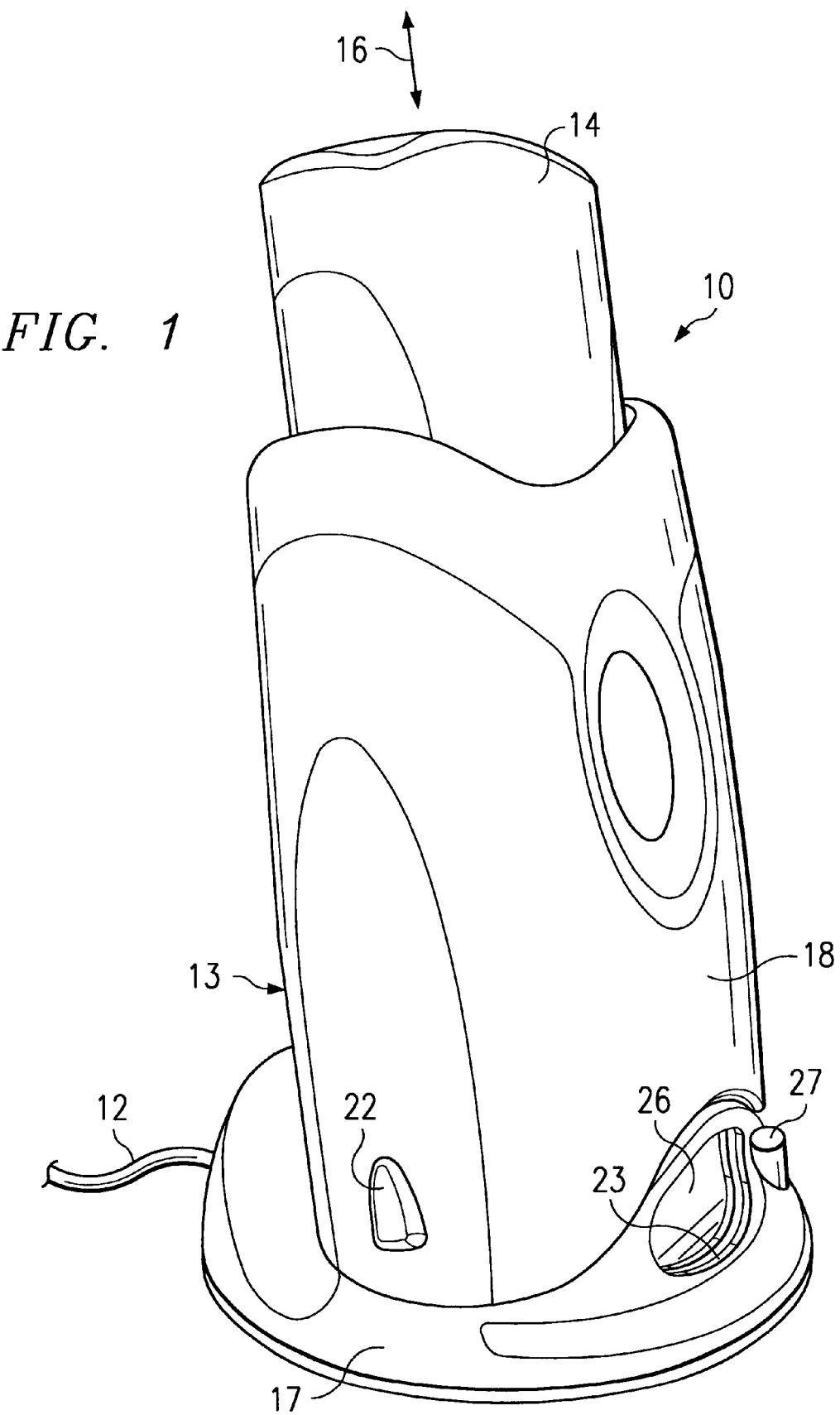
FIG. 1 is a diagrammatic perspective view of an information storage device which embodies the present invention.

FIG. 1 is a diagrammatic perspective view of an information storage device 10 which embodies aspects of the present invention, and which can be coupled by a cable 12 to a not-illustrated computer system of a known type. The information storage device 10 includes a receiving unit or cradle 13, and includes an information storage cartridge 14 which is removably inserted into the cradle 13. The cartridge 14 is inserted into and removed from the cradle 13 in directions which are approximately vertical, as indicated by a double-headed arrow 16 in FIG. 2. The cradle 13 includes a base or interface module 17, and a drive module 18. The interface module 17 and drive module 18 are physically separate modules, which are releasably coupled to each other by a not-illustrated coupling mechanism. Details of the coupling mechanism are not needed in order to understand the present invention. Therefore, the coupling mechanism is not illustrated and described in detail.

Two manually operable release buttons are provided on opposite sides of the drive module 18, and one of these two buttons is visible at 22 in FIG. 1. When the two release buttons 22 are simultaneously manually pressed, the detachable coupling between the drive module 18 and the interface module 17 is released, so that these modules can be separated.

The interface module 17 has a window 23 provided through a front wall portion thereof. A liquid crystal display (LCD) 26 is provided on the drive module 18, and is visible through the window 23 of the interface module 17 when these two modules are releasably coupled to each other. A manually operable eject button 27 is provided on the interface module 17. When the eject button 27 is manually pressed downwardly, the interface module 17 sends the drive module 18 an electrical signal, and this signal causes the drive module 18 to release a locking or latching mechanism that holds the cartridge 14 in place, and to then effect a partial ejection of the cartridge 14. The manner in which this takes place is discussed in more detail later.

Figure 2:
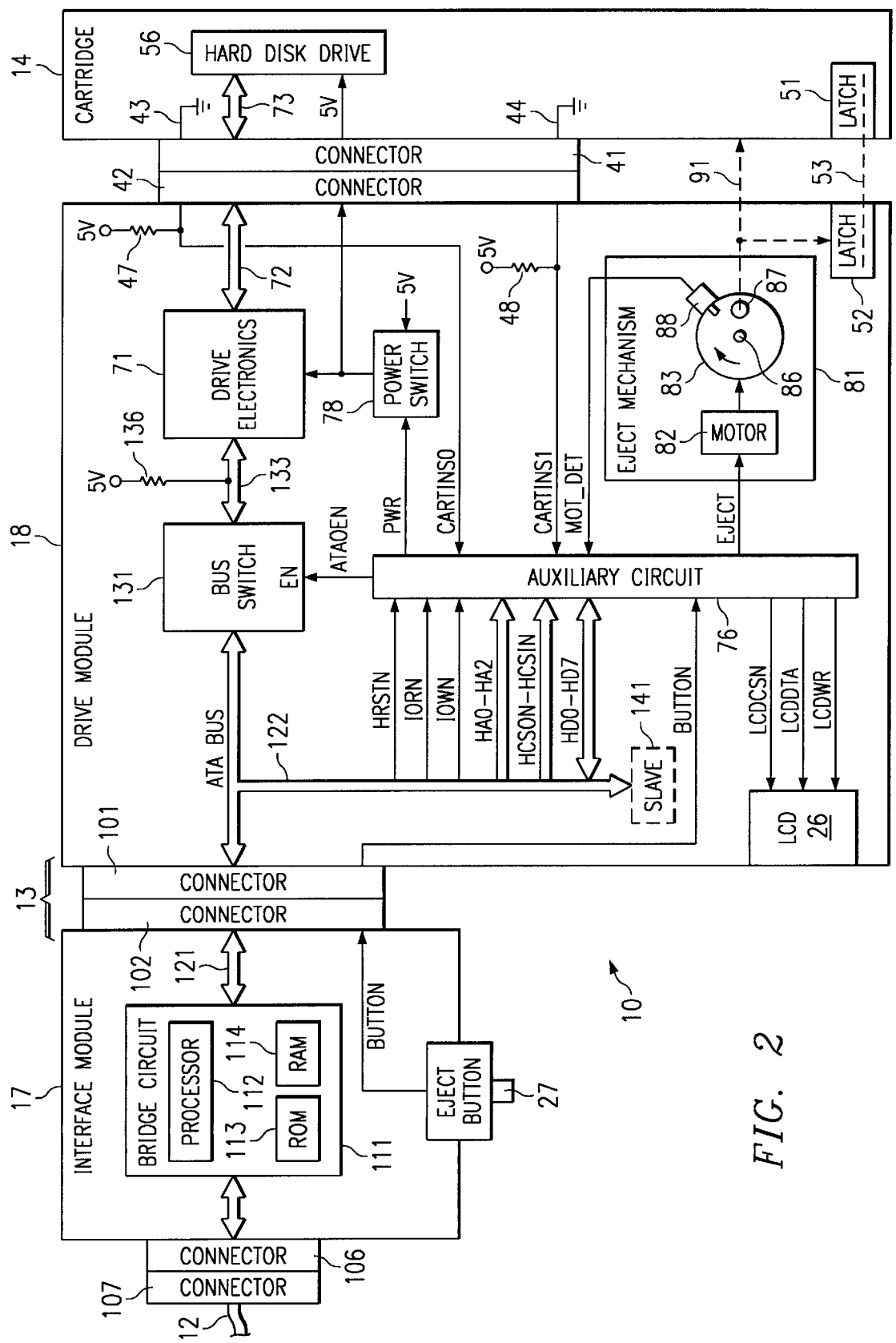
FIG. 2 is a block diagram of the information storage device of FIG. 1, showing selected internal components of the information storage device.
Figure 3B:
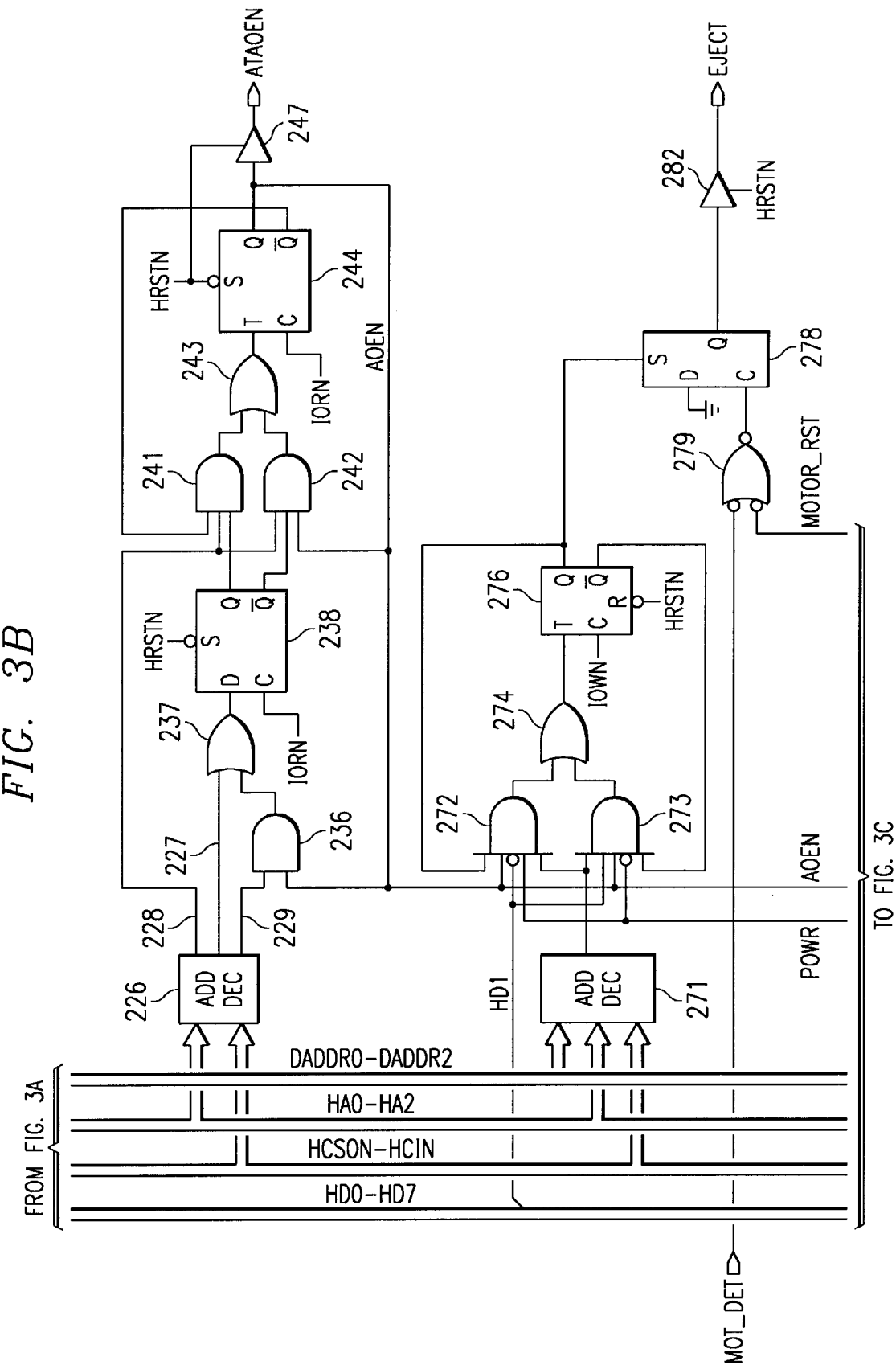
FIG. 3 includes several separate but related figures that collectively depict a circuit schematic diagram showing some of the circuitry disposed within an auxiliary circuit which is a component of the information storage device of FIG. 1.
Figure 3C:
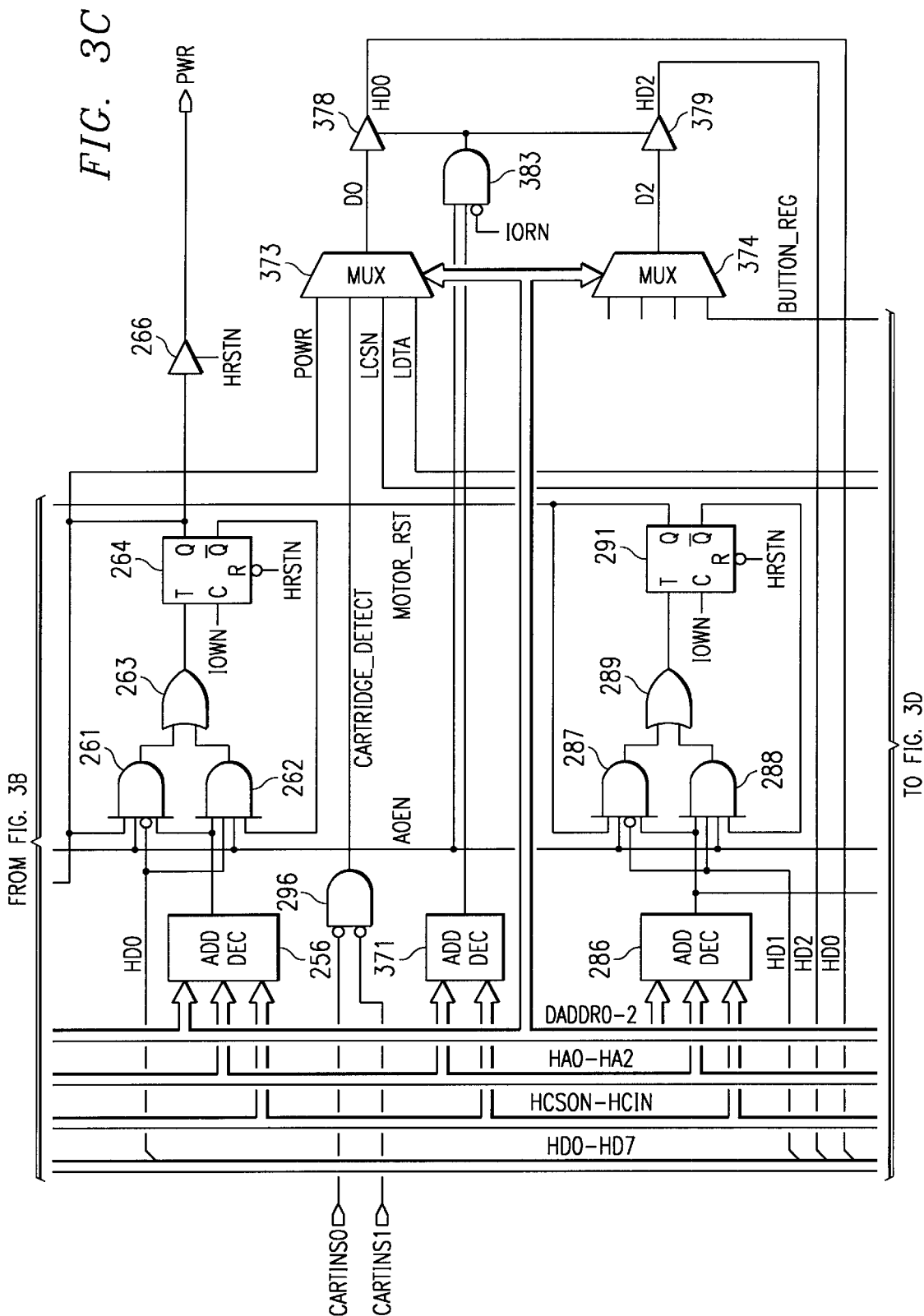
Figure 3D:
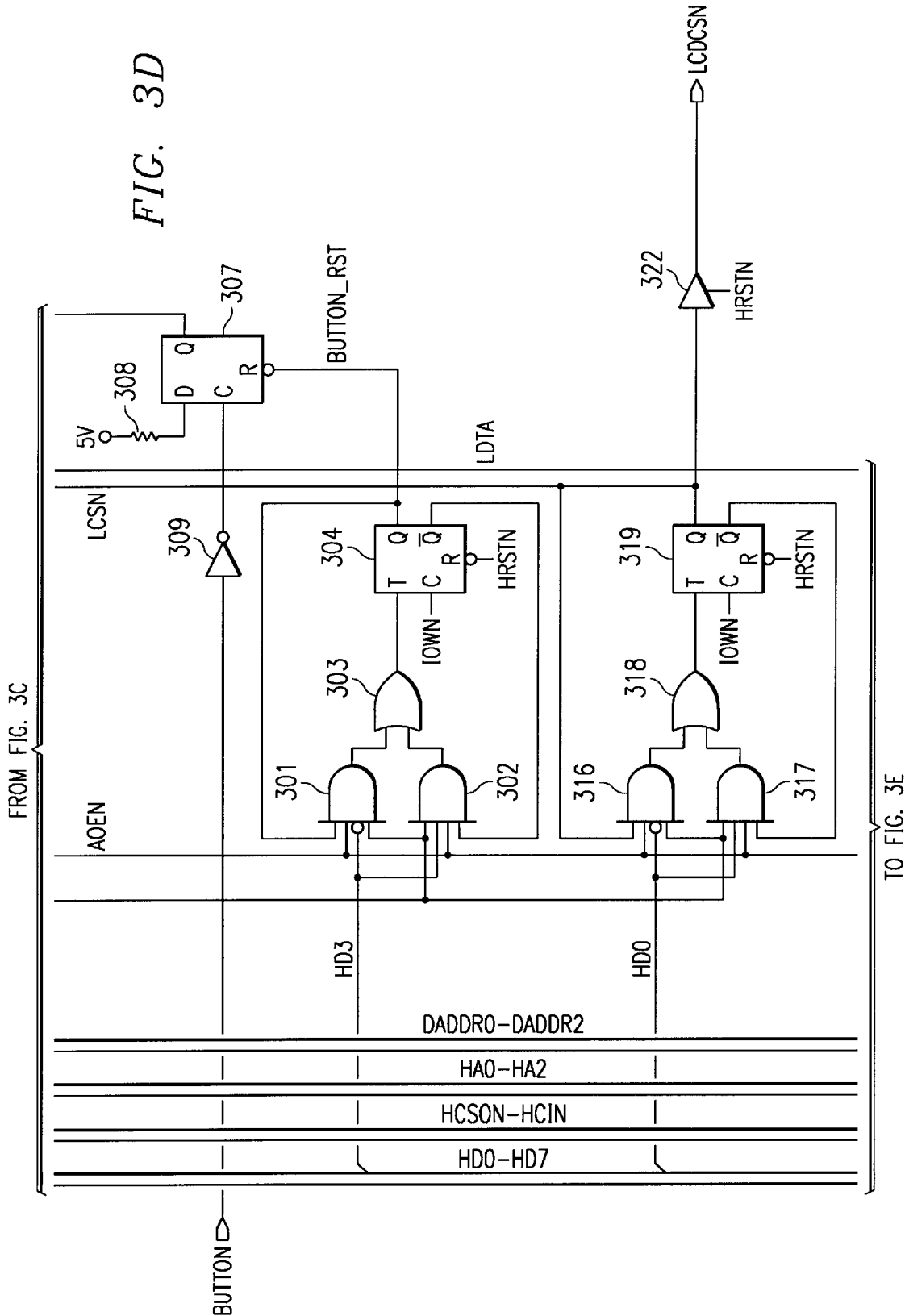
Figure 3E:
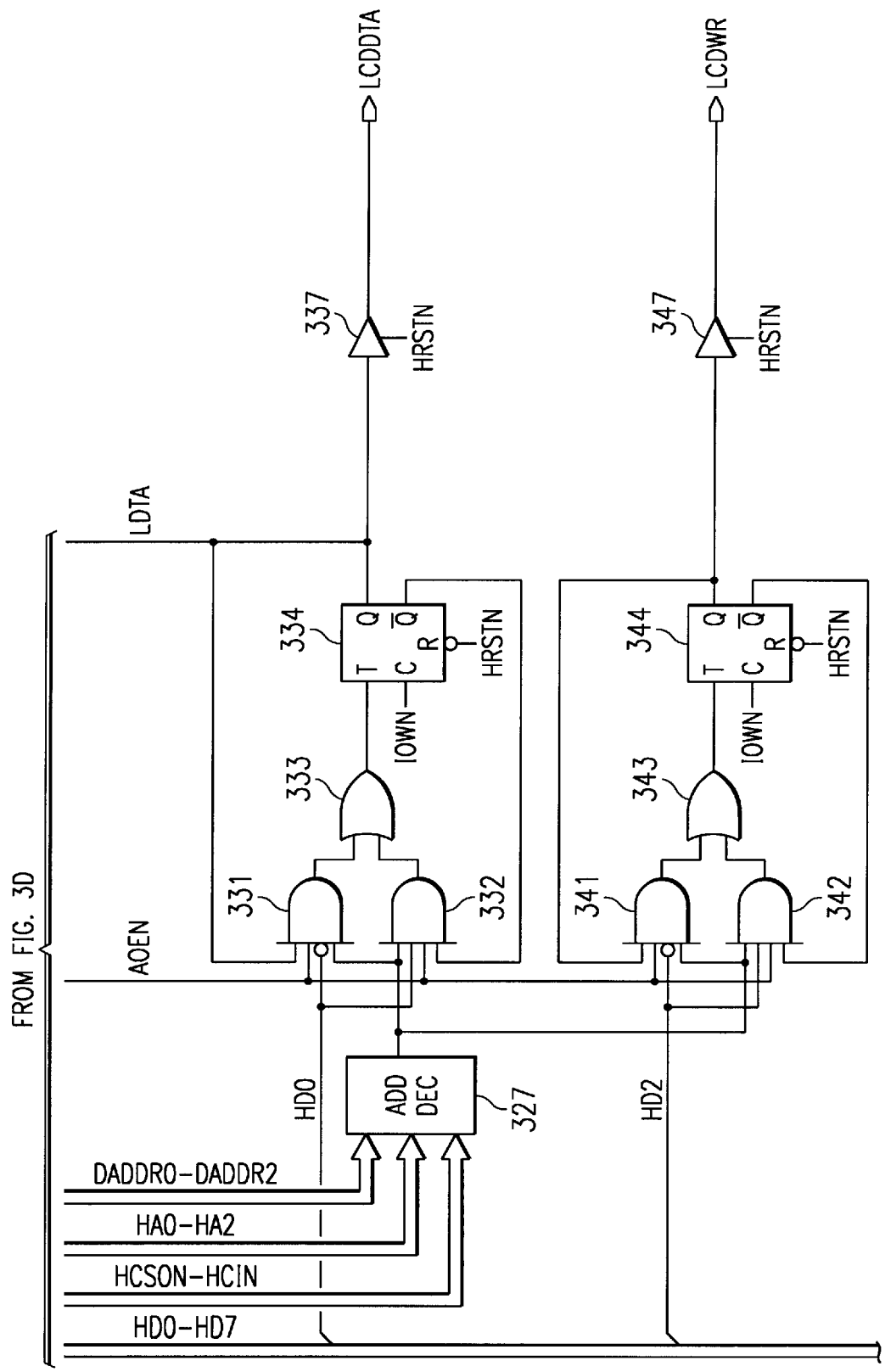

FIG. 2 is a block diagram of the information storage device 10 of FIG. 1, showing selected internal components. FIG. 2 is not intended to show all of the internal components of the device 10, but only components that help to convey an understanding of the present invention. In FIG. 2, signal names which end in the letter "N" are active low signals.

As shown in FIG. 2, the cartridge 14 has a connector 41, and the drive module 18 has a connector 42 which releasably engages the connector 41 when the cartridge 14 is removably disposed in the drive module 18. The connectors 41 and 42 each have a plurality of pins. The pins are arranged in pairs, which each include one of the pins on connector 41 and one of the pins on connector 42. When the connectors 41 and 42 are matingly engaged, the two pins of each pair are in electrical contact with each other.

The pairs of connector pins include two predetermined pairs, which are configured so that at least one of the pins of each selected pair is slightly shorter than pins on the same connector which are not part of either predetermined pair. Consequently, as the connectors 41 and 42 are moved into mating engagement, the pins of each of these two predetermined pairs make electrical contact with each other after the pins of all other pairs have made electrical contact. These two predetermined pairs are each located near a respective end of the connectors 41–42. For each of these two predetermined pairs, the pin which is part of the connector 41 is coupled to ground, as indicated at 43 and 44. As to the other pins of these two predetermined pairs, which are parts of the connector 42, each is coupled to a respective signal line CARTINS0 or CARTINS1, and these two signals are in turn each coupled to a respective pull-up resistor 47 or 48. It will be recognized that, when the connectors 41 and 42 are separated, the pull-up resistors 47 and 48 cause each of the signal lines CARTINS0 and CARTINS1 to have a logic high level. On the other hand, when the connectors 41 and 42 are fully matingly engaged, the grounds at 43 and 44 pull each of the signal lines CARTINS0 and CARTINS1 to a logic low.

As the connectors 41 and 42 are moved into mating engagement, and as mentioned above, the two predetermined pairs of pins which correspond to the signal lines CARTINS0 and CARTINS1 achieve electrical contact only after the other pairs of pins in the connectors 41 and 42 have already made electrical contact. Thus, when both of the signals CARTINS0 and CARTINS1 have a logic low state, it is an indication that the connectors 41 and 42 are in full mating engagement all along the length thereof, and that both pins of every pair in the connectors should be in electrical contact with each other. The two pairs of pins that correspond to the signal lines CARTINS0 and CARTINS1 are provided near opposite ends of the connectors 41 and 42, in order to verify that both ends of these connectors are properly engaged. This avoids a situation where the cartridge 14 is tilted slightly and the connectors 41–42 are fully engaged at only one end, and this lack of full engagement goes undetected.

After the cartridge 14 has been properly and fully inserted into the cradle 13, a releasable latch mechanism serves to releasably retain the cartridge within the cradle. This latching mechanism include cooperating latch portions 51 and 52, which are respectively disposed in the cartridge 14 and in the drive module 18. The releasable latching between the latch portions 51 and 52 is represented diagrammatically at 53 by a broken line. The details of the latching mechanism are not needed in order to understand the present invention, and the latching mechanism is therefore not illustrated and described here in detail.

The cartridge 14 contains a hard disk drive mechanism 56. The internal structure of the hard disk drive mechanism 56 is known, and detailed information about that internal structure is not needed in order to understand the present invention. Accordingly, the internal structure of the hard disk drive mechanism 56 is not illustrated in the drawings, and is only briefly discussed here for purposes of completeness. In particular, the hard disk drive mechanism 56 includes a sealed housing, and includes within the sealed housing a data storage medium in the form of a rotatable hard disk having a magnetic material on one side thereof, and a spin motor which can effect rotation of the hard disk. The hard disk drive mechanism 56 also includes within the sealed housing an actuator arm supported for pivotal movement, a read/write head supported at one end of the actuator arm for movement adjacent and approximately radially of the magnetic surface on the disk in response to pivotal movement of the arm, and a voice coil motor (VCM) which effects pivotal movement of the actuator arm in response to electrical signals.

The drive module 18 includes a drive electronics circuit 71, which is coupled to the hard disk drive mechanism 56 through a drive control bus which includes portions 72 and 73 that are respectively disposed in the drive module and the cartridge. The connectors 41 and 42 electrically couple the portions 72 and 73 of the drive control bus. In order to help minimize the cost of the drive module 18, the drive electronics circuit 71 used in the disclosed embodiment is a pre-existing circuit. For example, the drive circuit 71 could be the drive electronics circuit used in the hard disk drive unit commercially available under the tradename TRAVELSTAR 20GN from IBM Corporation of Armonk, N.Y. With this in mind, it will be recognized that the pre-existing drive electronics circuit 71 was designed with the expectation that it would be continuously coupled physically and electrically to the hard disk drive mechanism 56.

Stated differently, the drive electronics circuit 71 is thus not designed to deal with considerations relating to the removability of the cartridge 14, such as the fact that the drive electronics circuit 71 will be decoupled from the hard disk drive mechanism 56 when the cartridge 14 is removed from the cradle 13. The drive module 18 therefore includes other components that deal with removability considerations for the cartridge, including among other things an auxiliary circuit 76 and a power switch 78. The above-discussed signals CARTINS0 and CARTINS1 from the connector 42 are each coupled to a respective input of the auxiliary circuit 76. The internal structure of the auxiliary circuit 76 is discussed in more detail later.

The power switch 78, when enabled, supplies a 5 VDC operating voltage to the drive electronics circuit 71 and, through the connectors 41–42, to the hard disk drive mechanism 56 disposed within the cartridge 14. On the other hand, when the power switch 78 is disabled, it interrupts this supply of operating power to the circuit 71 and the mechanism 56. The power switch 78 is enabled and disabled by a control signal PWR, which is generated by the auxiliary circuit 76, in a manner discussed in more detail later.

The drive module 18 includes an eject mechanism 81, and the eject mechanism 81 includes a motor 82. The motor 82 is drivingly coupled to a crank member 83, which is supported for rotation by a pivot pin 86. The crank member 83 may be a gear, and the driving coupling between the motor 82 and the crank member 83 may be effected by a not-illustrated gear train. When the crank member 83 is being rotated by the motor, it rotates in a clockwise direction in FIG. 2. A pin 87 is provided on the crank member 83, at a location eccentric to the pivot pin 86. When the motor 82 of the eject mechanism 81 is not running, the crank member 83 not being rotated by the motor, and remains in the position which is shown in FIG. 2. When the eject mechanism 81 is activated, the motor 82 effects rotation of the crank member 83, in particular so that the crank member 83 rotates 360° in a clockwise direction in FIG. 2, and ends up back in its starting position, which is the position shown in FIG. 2.

A switch 88 is stationarily supported near the crank member 83, and the pin 87 on the crank member 83 engages and actuates the switch 88 after the crank member 83 has rotated through most of its 360° movement. The switch 88 has a motor detect output MOT_DET, which is coupled to an input of the auxiliary circuit 76. The auxiliary circuit 76 generates an output signal EJECT, which is coupled to and controls the motor 82 in the eject mechanism 81.

As the crank member 83 is rotated through its 360° movement, the pin 87 engages and moves structure which is represented by a broken line 91 in FIG. 2, and which effects two functions. First, the structure 91 effects a release of the latching engagement 53 between the latch portions 51 and 52, in order to permit removal of the cartridge. Second, the structure 91 effects physical movement of the cartridge 14 relative to the drive module 18 through a distance sufficient to disengage the connector 41 from the connector 42.

The auxiliary circuit 76 has three outputs which are each coupled to respective input of the LCD 26. The first output carries a signal LCDCSN, which is a chip select signal that enables control circuitry disposed within the LCD 26. The second output carries a signal LCDDTA, which is a series of data bits sent sequentially to the LCD 26. The third output carries a signal LCDWR, which is a write signal that specifies when the LCD 26 can accept valid data from the data line LCDDTA.

The drive module 18 has a connector 101, and the interface module 17 has a connector 102 that matingly engages the connector 101 when the interface module 17 and the drive module 18 are physically coupled to each other in the manner shown in FIG. 1. The eject button 27 of the interface module produces an output signal BUTTON, which is coupled through the connectors 101–102 to an input of the auxiliary circuit 76.

The interface module 17 has a further connector 106, which is releasably coupled to a connector 107 that is provided at the end of the cable 12. The interface module 17 contains a bridge circuit 111, and the bridge circuit includes a processor 112, a read only memory (ROM) 113 that stores information such as the program executed by the processor 112, and a random access memory (RAM) 114 in which the processor 112 can store variables and other information that change dynamically during program execution. The bridge circuit 111 has one port which is coupled to the connector 102, and has a different port which is coupled to the connector 106. In the disclosed embodiment, the bridge circuit 111 is a pre-existing component in the form of an integrated circuit, and is capable of interfacing a communication protocol used at the connector 102 with a different communication protocol used at the connector 106.

In the disclosed embodiment, the communication protocol used between the bridge circuit 111 and the connectors 101–102 is the AT Attachment (ATA) protocol, which is an industry standard. The ATA protocol actually has several versions, and the one used in the disclosed embodiment is the Intelligent Drive Electronics (IDE) version. This particular protocol was specifically developed to facilitate communication with the drive electronics circuit for a disk drive, such as the circuit shown at 71 in FIG. 2. All communications between the bridge circuit 111 and the connector 106 are effected according to a different protocol, and in the disclosed embodiment this protocol is the Universal Serial Bus (USB) protocol, which is an industry standard.

As discussed above, it is possible to disconnect the interface module 17 from the drive module 13, which includes disengagement of the connectors 101 and 102. The interface module 17 can be selectively replaced with any one of several other interface modules which are all different, and which are not separately shown in the drawings. Each of these other interface modules is similar to the interface module 17, except that the bridge circuit provided in each interface module is different, and the structure of the connectors provided between the interface module and the cable 12 is different.

Each of these different bridge circuits communicates with the drive module 18 using the ATA protocol, but communicates through the cable 12 using a respective one of several communication protocols which are different from each other and from the ATA protocol. As mentioned above, the bridge circuit 111 in the interface module 17 of FIG. 2 communicates with the cable 12 using the USB protocol. Another interface module, which is not illustrated, contains a bridge circuit which communicates through the cable 12 using the IEEE 1394 ("Firewire") protocol, which was promulgated by the Institute of Electrical and Electronic Engineers. Still another interface module, which is not illustrated, contains a bridge circuit which communicates through the cable 12 using the Small Computer System Interface (SCSI) protocol. Yet another interface module, which is not illustrated, contains a bridge circuit that communicates through the cable 12 using the Personal Computer Memory Card International Association (PCMCIA) protocol, which is also known as the PC Card protocol. Still other interface modules could have bridge circuits that communicate through the cable 12 using other suitable protocols, including protocols developed at some future time.

Each of the various bridge circuits discussed above is typically an integrated circuit which has a predefined hardware configuration, but in which the ROM 113 can be modified to change and/or supplement the native program executed by the processor of the bridge circuit. Thus, according to one aspect of the present invention, the operation of each bridge circuit can be adjusted to some extent in order to account for considerations relating to the removability of the cartridge 14. Some of these pre-existing bridge circuits have a spare output that could be used to deal with at least some removability issues, but other existing bridge circuits do not have any spare outputs. Further, the bridge circuits which do have spare outputs typically lack enough outputs to adequately handle all removability issues. Further, there is no standardization among the various bridge circuits with respect to the existence and/or operation of extra outputs.

As a result, to the extent that several interface modules with respective different bridge circuits therein are to be capable of being interchangeably coupled to the drive module 18, it would be problematic to try to accommodate all removability issues in a standardized manner compatible with the hardware of each of several different bridge circuits. This is a further reason why the auxiliary circuit is provided in the drive module 18, because the auxiliary circuit 76 serves as standardized hardware that can be readily used by a variety of types of bridge circuits to handle removability considerations, without regard to the various differing hardware configurations of these bridge circuits, and the software program in each bridge circuit can be reprogrammed to include intelligence that knows about and can interact with the auxiliary circuit 76.

As mentioned above, each bridge circuit in each version of the interface module communicates with the drive module 18 using the ATA protocol. To facilitate communication according to this protocol, the information storage device 10 includes an ATA bus with portions 121 and 122 that are respectively disposed in the interface module 17 and in the drive module 18, and that are operatively coupled through the connectors 101–102. The ATA bus has a standard configuration of signal lines, which is well known in the art. Several signals from the ATA bus are coupled to the auxiliary circuit 76, including a system reset signal HRSTN, an input/output read signal IORN, an input/output write signal IOWN, three address lines HA0–HA2, two chip select lines HCS0 and HCS1, and eight data lines HD0–HD7. The data lines HD0–HD7 are bi-directional, and the other ATA bus lines coupled to the auxiliary circuit 28 are each an input to the auxiliary circuit 76.

The drive module 18 includes a bus switch 131. In the disclosed embodiment, the bus switch is available commercially from Texas Instruments Incorporated of Dallas, Tex., as part number SN74CBT16211A. The bus switch 131 has two operational modes, in which it respectively effects and interrupts an operational coupling between each line of the ATA bus 122 and a corresponding line of an ATA bus extension 133. In the disclosed embodiment, the ATA bus extension is also coupled to an ATA port of the drive electronics circuit 71.

The bus switch 131 is controlled by an active-low enable line ATAOEN, which is generated by the auxiliary circuit 76. When the enable signal ATAOEN is a logic low, the bus switch 131 is enabled, and electrically couples each line of the ATA bus 122 with a corresponding line of the ATA bus extension 133. When the enable signal ATAOEN is a logic high, the bus switch 131 is disabled, and decouples all the lines of the ATA bus 122 from the corresponding lines of the ATA bus extension 133.

Four lines of the ATA bus extension 133 are each coupled to a respective pull-up resistor, including the lines that carry the signals IORN, IOWN, HCS0N, and HCS1N. These resistors are represented collectively in FIG. 2 by a single pull-up resistor 136. When the bus switch 131 is disabled, the pull-up resistors at 136 pull corresponding lines of the ATA bus extension 133 to a logic high, so that the drive electronics circuit 71 sees signal levels that cause it to avoid trying to communicate with the ATA bus 122 while the bus switch 131 is disabled. In this regard, the drive electronics circuit 71 is designed to assume that it is always coupled to the ATA bus 122, and it thus does not understand that there may be points in time when it has been decoupled from the bus 122 by the bus switch 131.

In terms of traditional ATA bus nomenclature, the bridge circuit 111 in the interface module 17 serves as the host for the ATA bus 122, and the drive electronics circuit 71 in the drive module 18 serves as the master device when it is coupled to the bus 122 by the switch 131. The auxiliary circuit 76 interacts with the bus 122 as a form of alternative master device. In this regard, the auxiliary circuit 76 controls the bus switch 131, and thus knows when the drive electronics circuit 71 is coupled to the bus and acting as a master device on the bus. Consequently, when the switch 131 is enabled, the auxiliary circuit 76 does not interact with the bus 122, except to watch for a command sequence which instructs it to disable the bus switch 131, in a manner described later. In contrast, when the bus switch 131 is disabled, the auxiliary circuit 76 knows that the drive electronics circuit 71 is decoupled from the bus 122 and therefore not acting as a master device. Consequently, the auxiliary circuit 76 can act as a master device while the bus switch 131 is disabled.

Since the processor 112 in the bridge circuit 111 uses the auxiliary circuit 76 to control the state of the bus switch 131, it knows whether the current master device is the drive electronics circuit or the auxiliary circuit 76. Therefore, when the processor 112 accesses an ATA address which is reserved for a master device, it knows whether the drive electronics circuit 71 or the auxiliary circuit 76 is currently responsive to that address. Thus, by providing the bus switch 131, the auxiliary circuit 76, and a degree of intelligence within the bridge circuit 111 about the existence of the bus switch 131 and the auxiliary circuit 76, the bridge circuit 111 can handle both the drive electronics circuit 71 and the auxiliary circuit 76 as alternate master devices that are each independently responsive to certain addresses reserved for a master device, even though the ATA bus 122 is based on a standard which contemplates the presence of only a single master device on the bus. The drive electronics circuit 71 believes that it is actively coupled at all times to the ATA bus 122, and that it is the only master device on this bus. It is completely unaware that the bus switch 131 sits between it and the bus 122, and can be disabled from time to time in order to permit a different master device in the form of the auxiliary circuit 76 to interact with the bus 122 in a manner transparent to the drive electronics circuit 71.

As noted above, the ATA bus 122 conforms to a standard designed to handle only a single master device on the bus. In addition to the single master device, the ATA bus standard allows for the optional provision of a single slave device on the bus, for example as shown in broken lines at 141. The disclosed embodiment of FIG. 2 does not actually include any slave device, which is why the slave device 141 is shown in broken lines in FIG. 2. The slave device 141 is included in broken lines in FIG. 2 in order to reflect the fact that the configuration and operation of the ATA bus 122 in FIG. 2 does not in any way preclude the provision of a slave device 141, even though no such slave device happens to be present in the embodiment of FIG. 2.

As mentioned above, when the bus switch 131 is enabled in order to couple the drive electronics circuit 71 to the ATA bus 122, the auxiliary circuit 76 does not interact with the bus 122, except to watch for a command sequence that instructs the auxiliary circuit 76 to disable the bus switch 131 and begin acting as a master device. In the disclosed embodiment, this command sequence is defined to be two successive reads across the bus 122 to the same selected address, which happens to be a register within the drive electronics circuit 71. The program executed by the processor 112 in the bridge circuit 111 has sufficient intelligence to avoid successively reading this register twice in succession, except when there is a specific intent to turn off the bus switch 131. The circuit 71 will output data from the register in response to each of the two successive reads, and does not really care that a redundancy has occurred. The auxiliary circuit 76 does not interact with the bus 122 in response to either of these successive register reads, but instead maintains an internal record of what is happening.

When the auxiliary circuit 76 detects the second of the two successive reads of this particular register, it inverts the state of the enable line ATAOEN in order to turn off the switch 131, and then the auxiliary circuit 76 begins acting as a master device which responds to activity on the ATA bus 122. In order to disable the auxiliary circuit 76 and turn the bus switch 131 back on, the bridge circuit 111 performs two successive reads to a different address. The drive electronics circuit 71 will not see these two successive reads, because it is decoupled from the bus 122. The auxiliary circuit 76 will see both reads and, when it detects the second of these reads, it will change the state of the enable signal ATAOEN so as to enable the bus switch 131, and then stop responding to activity on the bus 122, except to monitor for two successive reads of the register that would cause it to again disable the switch 131 and begin interacting with the bus 122.

One of the considerations involved in providing the switch 131 is that the drive electronics circuit 71 is sometimes instructed to carry out a specified action which takes a relatively long period of time to complete. For example, the drive electronics circuit 71 may be instructed to format the hard disk disposed within the hard disk drive mechanism 56, which in some cases may take about 15 to 30 minutes, or longer. While the drive electronics circuit 71 is engaged in formatting the hard disk, it does not expect that there will be any other activity on the bus 122. However, the bus switch 131 can be disabled while such a long command is in progress, so that the bridge circuit 112 can carry out certain operations through the auxiliary circuit 76 while the drive electronics circuit 71 is carrying out the format operation, and the drive electronics circuit 76 will be unaware that this is occurring.

For example, due to the duration of a formatting operation, it is desirable to be able use the LCD 26 to provide the user with ongoing status information about the progress of the formatting operation. In particular, the LCD can be used to display a changing numerical value which represents the percentage of the disk which has been formatted and/or the percentage of the disk which remains to be formatted. Alternatively, the LCD 26 could present a graphical indication, such as a bar graph, representing what portion of the formatting has been completed and/or what portion of the formatting remains to be completed. In order to be able to use the LCD 26 in this manner, since control signals for the LCD 26 are sent from the bridge circuit 111 across the bus 122 and through the auxiliary circuit 76, the bridge circuit 111 needs to use the ATA bus 122 to communicate with the auxiliary circuit 76. By disabling the bus switch 131 at periodic times during the format operation, ongoing information regarding the status of the format operation can be supplied from the bridge circuit 11 through the bus 122 and auxiliary circuit 76 without the knowledge of the drive electronics circuit 71, and thus without disrupting the operation of the circuit 71.

As another example, a user may press the eject button 27 during a formatting operation. It is desirable that the cartridge 14 not be ejected from the cradle 13 in the middle of a formatting operation, because the disk could be left with formatting inconsistencies that will render cartridge 14 inoperable. On the other hand, completely ignoring the operation of the eject button 27 could confuse and/or annoy the user. It is therefore desirable to be able to detect the operation of the button 27 and then display some form of message on the LCD 26, which may for example ask the user to wait until the formatting operation has been completed. Since the bus switch 131 allows the drive electronics circuit 71 to be decoupled from the bus 122, the bridge circuit 111 can detect the operation of the eject button 27 through the bus 122 and auxiliary circuit 76, and can then send an appropriate message to the LCD 26 through the bus 122 and auxiliary circuit 76, all while the drive electronics circuit 71 is carrying out the formatting operation.

It will be recognized that the drive electronics circuit may finish the long operation which it is carrying out at a point in time when the bus switch 131 is still disabled. As noted above, the pull-up resistors collectively represented at 136 hold selected lines of the ATA bus extension 133 in a logic high state, which causes the drive electronics circuit 71 to wait for authorization to communicate over the bus 133. Once the bus switch 131 is enabled to again couple the circuit 71 to the ATA bus 122, the bridge circuit 111 will change one or more of the signals of bus extension bus 133 coupled to the pull-up resistors 136 to a logic low state, in a manner signifying that the circuit 71 can now communicate information across the bus.

FIG. 3 is a circuit schematic showing selected portions of the auxiliary circuit 76, arranged as several related drawing figures that collectively show the entire circuit, and that are collectively referred to herein as FIG. 3. It should be noted that FIG. 3 does not show the entire circuit schematic for the auxiliary circuit 76, but only selected portions thereof that facilitate an understanding of the present invention.

In FIG. 3, input terminals of the auxiliary circuit 76 are shown along the left side of the figure, including the above-mentioned signals HRSTN, IORN, IOWN, HA0–HA2, HCS0N–HCS1N, MOT_DET, CARTINS0–CARTINS1, and BUTTON. The terminals for the bi-directional data bus HD0–HD7 are also shown at the left side of FIG. 3. The terminals which represent outputs of the auxiliary circuit 76 are shown along the right side of FIG. 3, including the above-mentioned signals ATAOEN, EJECT, PWR, LCDCSN, LCDDTA, and LCDWR.

Near the top of FIG. 3 is an address decoder 201. The address decoder 201 is a circuit of a type known to those skilled in the art, and determines whether a predetermined address is present on the address lines of the ATA bus 122, which effectively include not only the lines HA0–HA2, but also the lines HCS0N–HCS1N. In the disclosed embodiment, the particular address detected by the address decoder 201 is represented according to ATA convention as 1F6H, where the first character "1" represents the value on lines HCS0N-HCSLN, and the third character "6" represents the value on lines HA0–HA2. The output of the address decoder 201 is a logic high when this address in presented on the address lines of bus 122, and is otherwise a logic low.

Two three-input AND gates 206 and 207 each have one input coupled to the output of the address decoder 201. The gate 206 has an active low input coupled to the least significant bit HD0 of the data bus, and the gate 207 has an active high input coupled to the same bit of the data bus. The outputs of the gates 206 and 207 are coupled to respective inputs of a two-input OR gate 208, the output of which is coupled to the T input of a T-type flip-flop 209. The T-type flip-flop 209 reverses or "toggles" its current logic state if a logic high is present at the T input when a leading edge occurs in the signal present at its clock input C. On the other hand, if a logic low is present at the T input when the leading edge occurs at the clock input C, the flip-flop 209 does not change its state.

The output Q of the flip-flop 209 is a signal DADDR0, and is coupled to an input of the AND gate 206. The inverted output of the flip-flop 209 is coupled to an input of the AND gate 207. The input/output write signal IOWN from the ATA bus 122 is applied to the clock input C of the flip-flop 209, and the reset signal HRSTN from the bus 122 is applied to an active-low reset input R of the flip-flop 209.

When the output of the address decoder 201 is enabled, a pulse on the write signal IOWN causes the flip-flop 209 to be loaded with the current state of the bit which is present on line HD0 of the data bus. In this regard, if the flip-flop 209 currently contains a logic low, then the gate 207 will be enabled and the gate 206 will be disabled. If the bit on bus line HD0 is a logic high, then the output of gate 207 will be enabled and will be applied through gate 208 to the T input of flip-flop 209, so that the leading edge of a pulse on IOWN causes the flip-flop 209 to toggle and change its state from a logic low to a logic high. In effect, the logic high from bus line HD0 is loaded into the flip-flop 209. On the other hand, if the line HD0 of the bus is a logic low when the flip-flop 209 contains a logic low, the output of gate 207 will be a logic low, the output of gate 208 will be a logic low, and the flip-flop 209 will not toggle state in response to the leading edge at its clock input, thereby staying at a logic low, which is equivalent to loading the logic low from the bus line HD0 into the flip-flop 209.

Alternatively, if the flip-flop 209 currently happens to contain a logic high, then the gate 207 will be disabled and the gate 206 will be enabled. If the line HD0 of the data bus is a logic high, the output of gate 206 will be a logic low and the output at gate 208 will be a logic low, and the flip-flop 209 will not toggle in response to a leading edge at its clock input. It will thus continue to be in a logic high state, which is effectively the same as loading the logic high from bus line HD0 into the flip-flop 209. On the other hand, if the state of line HD0 is a logic low when the flip-flop contains a logic high, the output of gate 206 will be a logic high, the output of gate 208 will be a logic high, and the flip-flop 209 will toggle its state in response to a leading edge at its clock input, so as to change from a logic high to a logic low, thereby effectively loading the logic low from the line HD0 into the flip-flop 209.

When the system is first turned on, the bus reset signal HRSTN is initially maintained at a logic low, which acts through the reset input R of the flip-flop 209 to force the flip-flop 209 to an initial state which is a logic low. Thereafter, the reset signal HRSTN is changed to a logic high, and remains at a logic high throughout normal operation of the auxiliary circuit 76, unless the bridge circuit 111 makes a rare but intentional decision to reset most circuitry associated with the ATA bus 122, including the auxiliary circuit 76.

Two AND gates 211–212, an OR gate 213, and a T-type flip-flop 214 are interconnected in the same manner as the gates 206–208 and flip-flop 209, except that respective inputs of the gates 211–212 are coupled to the line HD1 of the data bus rather than the line HD0. Similarly, two AND gates 216–217, an OR gate 218, and a T-type flip-flop 219 are interconnected in a manner similar to the gates 206–208 and flip-flop 209, except that respective inputs of the gates 216 and 217 are coupled to the data bus line HD2 rather than the line HD0.

The three flip-flops 209, 214 and 219 together form a three-bit register, which is a bank register. The three outputs of this three-bit bank register serve as supplemental address lines DADDR0–DADDR2. In this regard, and as will become evident from the discussion with follows, the auxiliary circuit 76 includes more than one register that can respond to a given address on the bus address lines HA0–HA2 and HCS0N–HCS1N. But each such register is active only for a respective different value or address within the bank register defined by the flip-flops 209, 214 and 219. Thus, in a sense, the bank register provides a form of extended addressing internal to the auxiliary circuit 76, where the three additional signals DADDR0–DAADR2 supplement the standard address signals HA0–HA2 and HCS0N-HCS1N.

As mentioned above, the auxiliary circuit 76 sets the signal ATAOEN to a logic high in order to disable the bus switch 131, if the auxiliary circuit 76 detects two successive reads to a selected ATA bus address, which in the disclosed embodiment is 1F3H. Similarly, the auxiliary circuit 76 sets the signal ATAOEN to a logic low in order to enable the bus switch 131, if the auxiliary circuit 76 detects two successive reads to another selected ATA bus address, which in the disclosed embodiment is 1F2H. Since the signal ATAOEN is an active low signal, the bus switch 131 is enabled when ATAOEN is a logic low, and is disabled when ATAOEN is a logic high. The specific circuitry in FIG. 3 which carries this out will now be described.

More specifically, FIG. 3 shows an address decoder 226, which has three outputs 227–229. The output 227 is enabled if the address decoder 226 decodes the address 1F3H, which as discussed above can be used to set ATAOEN to a logic high in order to disable the bus switch 131. The output 228 is enabled if the address decoder 226 detects either the address 1F2H or the address 1F3H, which can respectively be used to set ATAOEN to a logic low or a logic high in order to respectively enable or disable the bus switch 131. The third output 229 is enabled if the address decoder 226 detects an access to an address other than either of the addresses 1F2H and 1F3H.

A two-input AND gate 236 has one input coupled to the output 229 of the address decoder 226, and has its output coupled to one of two inputs of an OR gate 237. The other input of the OR gate 237 is coupled to the output 227 of the address decoder 226, and the output of OR gate 237 is coupled to the D input of a D-type flip-flop 238. The read control signal IORN from the bus is applied to the clock input C of the flip-flop 238, and the bus reset signal HRSTN is applied to a set input S of the flip-flop.

Two three-input AND gates 241 and 242 each have an input coupled to the output 228 of the address decoder 226. The gate 241 has a further input coupled to the normal output Q of the flip-flop 238, and the gate 242 has an input coupled to the inverted output of the flip-flop 238. The outputs of the gates 241–242 are coupled to respective inputs of a two-input OR gate 243, the output of which is coupled to the T input of a T-type flip-flop 244. The clock input C of the flip-flop 244 is controlled by the signal IORN of the bus, and a set input S is controlled by the bus reset signal HRSTN.

The normal output Q of the flip-flop 244 is coupled to an input of a tri-state buffer 247, the output of which is coupled to the output terminal ATAOEN of the auxiliary circuit 76. The control input of the buffer 247 is coupled to the reset signal HRSTN. The buffer 247 is forced into a high-impedance mode while the reset signal HRSTN is activated during system initialization, but after that the buffer is enabled, and remains continuously enabled during normal system operation, except in the case of a rare and unusual circumstance where the bridge circuit 111 makes a decision to intentionally force a further reset. The normal output Q of the flip-flop 244 is a signal AEON, which is coupled to an input of the gate 236 and also to an input of the gate 242. The inverted output of flip-flop 244 is coupled to an input of the gate 241. The flip-flops 238 and 244 are each initially set to a logic high state, as a result of the reset signal HRSTN.

In order to explain the operation of this portion of the circuitry, assume that the flip-flops 238 and 244 each happen to currently have a logic low state, such that the signal ATAOEN is a logic low and is enabling the bus switch 131 so that it couples the drive electronics circuit 71 to the bus 122. If reads are carried out to addresses other than 1F2H or 1F3H, the decoder output 229 will be enabled and the decoder outputs 227–228 will be disabled. However, the output AEON of the flip-flop 244 will be a logic low, and will thus disable the gate 236. Both inputs to the gate 237 will thus be low, thereby applying a logic low to the D input of flip-flop 238, so that it is loaded with a logic low during each such read and does not change state. Since the signal 228 is a logic low, the gates 241–242 will be disabled, and the gate 243 will apply a logic low to the T input of flip-flop 244, such that the flip-flop 244 does not change state and remains a logic low.

If a read is performed at the address 1F2H, the decoder output 228 is enabled, and the decoder outputs 227 and 229 are both disabled. Thus, signal 229 will disable gate 236, both inputs of gate 237 will be disabled, the output of gate 237 will apply a logic low to the D input of flip-flop 238, and flip-flop 238 will be loaded with a logic low, which effectively maintains its existing state. Meanwhile, the normal output Q of flip-flop 238 will be disabling gate 241, and the normal output Q of flip-flop 244 will be disabling gate 242. Thus, both inputs to OR gate 243 will be disabled, and the output of OR gate 243 will apply a logic low to the T input of flip-flop 244, such that flip-flop 244 will not change state and thus will continue to be a logic low.

Now assume that two successive read operations are performed to the address 1F3H, for the purpose of setting the signal ATAOEN to a logic high in order to disable the bus switch 131. Each such read will cause the decoder outputs 227 and 228 to be enabled, and the output 229 to be disabled. A the time of the first such read, line 228 will be enabled, but the normal output Q of flip-flop 238 will be disabling gate 241, and the normal output Q of flip-flop 244 will be disabling gate 242. Gate 243 will thus be applying a logic low to the T input of flip-flop 244, such that flip-flop 244 will not change state and will remain a logic low. Meanwhile, however, since the decoder output 227 is enabled, the gate 237 will apply a logic high to the D input of the flip-flop 238, thereby causing flip-flop 238 to be set. Thus, after the first read, flip-flop 238 will contain a logic high and flip-flop 244 will contain a logic low.

When the second read occurs to address 1F3H, line 227 will again be enabled, and will again force gate 237 to apply a logic high to the D input of flip-flop 238, such that flip-flop 238 is again loaded with a logic high. Meanwhile, since the Q output of flip-flop 238 is now a logic high as a result of the first read to 1F3H, and since the other two inputs of the gate 241 are each receiving a logic high, the gate 241 causes the gate 243 to apply a logic high to the T input of the flip-flop 244, so that the flip-flop 244 will toggle its state and change from a logic low to a logic high. Consequently, after the second read operation, the flip-flops 238 and 244 will both contain a logic high. Further, the logic high from the normal output Q of the flip-flop 244 will be supplied through the buffer 247 to the enable line ATAOEN for the bus switch 131, thereby disabling the switch 131.

If read operations are thereafter carried out at addresses other than 1F2H or 1F3H, the decoder output 229 will be enabled, but the decoder outputs 227 and 228 will both be disabled. Both inputs of gate 236 will be receiving a logic high, and gate 236 will therefore cause gate 237 to apply a logic high to the D input of flip-flop 238, so that the flip-flop 238 is loaded with a logic high and thus maintains its current state. Meanwhile, since the decoder output 228 is disabled, the gates 241 and 244 will both be disabled, and the gate 243 will apply a logic low to the T input of flip-flop 244, such that the flip-flop 244 does not change state and thus stays at a logic high.

Assume that, in due course, two successive reads are performed to the address 1F2H for the purpose of changing the signal ATAOEN to a logic low in order to enable the bus switch 131. During each such read operation, the decoder output 228 will be enabled, but the decoder outputs 227 and 229 will be disabled. Since the decoder outputs 227 and 229 are disabled, both inputs to the gate 237 will be disabled, and the gate 237 will apply a logic low to the D input of flip-flop 238, SO that flip-flop 238 will be loaded with a logic low, thereby changing its state. Meanwhile, just before the flip-flop 238 changed its state, the gate 242 was disabled by the inverted output of the flip-flop 238, and the gate 241 was disabled by the inverted output of flip-flop 244. Thus, both gates applied a logic low to the inputs of gate 243, which in turn applied a logic low to the T input of flip-flop 244, such that the flip-flop 244 did not change state and continued to contain a logic high. Thus, after the first read operation, the flip-flop 238 will have changed from a logic high to a logic low, and the flip-flop 244 will remain at a logic high.

During the next read operation at the same address, the decoder outputs 227 and 229 will again be a logic low and thus disable both inputs to gate 237, such that gate 237 will apply a logic low to the D input of flip-flop 238, and flip-flop 238 will be again loaded with a logic low. Meanwhile, since decoder output 228 is enabled, since the normal output of flip-flop 244 is a logic high, and since the inverted output of flip-flop 238 is a logic high, the gate 242 will be enabled, and will force the gate 243 to apply a logic high to the T input of flip-flop 244. The flip-flop 244 will therefore change state from a logic high to a logic low. Consequently, after the second consecutive read operation to the address 1F2H, both flip-flops 238 and 244 will have been set to a logic low. Since the normal output AOEN of the flip-flop 244 will have changed to a logic low, this logic low will be supplied through buffer 247 to the signal ATAOEN, thereby enabling the buffer 131.

A different part of the circuitry shown in FIG. 3 will now be described, in particular the portion of the circuitry which controls the PWR output of the auxiliary circuit 76. An address decoder 256 detects an access to an ATA bus address of 1F6H, when a value of 0 is present in the above-discussed bank register (defined by flip-flops 209, 214, and 219). Two four-input AND gates 261 and 262, an OR gate 263, and a T-type flip-flop 264 are coupled together in a manner similar to that described above for gates 206–208 and flip-flop 209. The gates 261 and 262 each have an input coupled to the output of address decoder 256. Thus, both gates will be disabled when the address decoder 256 is not detecting the address and bank of interest, thereby preventing the flip-flop 264 from changing state. This effectively means that the one-bit register defined by flip-flop 264 is prevented from being loaded. Further, each of the gates 261–262 has an input coupled to the output AOEN of the flip-flop 244. Consequently, when the signal AOEN and the corresponding signal ATAOEN are a logic low to enable the bus switch 131, the gates 261 and 262 are each disabled in order to disable the gate 263 and apply a logic low to the T input of the flip-flop 264, so that the flip-flop 264 does not change state. In effect, loading of the register represented by flip-flop 264 is prevented during time periods when the auxiliary circuit 76 is ignoring the ATA bus 122 because the drive electronics circuit 71 is coupled through the switch 131 to the bus 122.

The remaining inputs to the gates 261–262 are configured so as to account for the toggle function of the flip-flop 264, in a manner similar to that described above for the gates 206–208 and flip-flop 209. In particular, the logic state on line HD0 of the data bus will be loaded into the flip-flop 264 when the signal AEON is a logic high and the decoder 256 is detecting the address and bank of interest.

The normal output Q of the flip-flop 264 is a signal POWR, which is an internal signal of the auxiliary circuit 76, and which is coupled through a tri-state buffer 266 to the output terminal PWR of the auxiliary circuit 76. The buffer 266 is controlled by the reset signal HRSTN. It is thus disabled during system initialization, and is thereafter continuously enabled during normal system operation. By selectively setting and resetting the flip-flop 264, the bridge circuit 111 (FIG. 2) can selectively control the state of the PWR output of the auxiliary circuit 76.

Turning to the portion of the auxiliary circuit 76 which controls the eject mechanism 81 (FIG. 2), an address decoder 271 is configured to detect an address which corresponds an ATA address of 1F6H in association with a value of 1 in the above-discussed bank register. Two AND gates 272 and 273, an OR gate 274, and a T-type flip-flop 276 are coupled in a manner similar to the gates 261–263 and flip-flop 264, except that the gates 272–273 are coupled to line HD1 of the data bus, and each have an extra input which is coupled to the internal signal POWR from the flip-flop 264. Consequently, the logic level present on line HD1 of the data bus is loaded into the flip-flop 276 when the address decoder 271 detects the appropriate address, when the signal AEON is a logic high to disable the bus switch 131, and when the signal POWR is a logic low to reflect the fact that power to the drive electronics 71 and hard disk drive mechanism 56 has been turned off. In other words, the POWR signal is taken into account in order to ensure that ejection of the cartridge 14 is not initiated unless power has been turned off to the drive electronics circuit 71 and the hard disk drive mechanism 56.

The normal output Q of the flip-flop 276 is coupled to the active-high set input S of a D-type flip-flop 278, which has its D input coupled to ground. Consequently, when the flip-flop 276 is loaded with a logic high, the flip-flop 278 is forced to a logic high. A NOR gate 279 has its output coupled to the clock input C of flip-flop 278, and had two active-low inputs, one of which is coupled to the input terminal MOT_DET of the auxiliary circuit 76. The other active-low input of gate 279 is coupled to an internal signal MOTOR_RST of the auxiliary circuit 76, which will be discussed later. The normal output Q of the flip-flop 278 is coupled through a tri-state buffer 282 to the output terminal EJECT of the auxiliary circuit 76. The buffer 282 is controlled by the reset signal HRSTN, and is thus disabled during system initialization, and subsequently continuously enabled during normal system operation.

The flip-flop 276 and the flip-flop 278 are both normally set to a logic low, so that the output signal EJECT is a logic low and keeps the motor 82 of the eject mechanism 81 turned off. When the bridge circuit 111 wishes to initiate an eject operation, it loads the flip-flop 276 with a logic high, and then immediately loads the flip-flop 276 with a logic low. This produces a pulse to the set input S of the flip-flop 278, thereby forcing the flip-flop 278 to a logic high. This causes the EJECT output of the auxiliary circuit 76 to be set to a logic high, which enables the motor 82 (FIG. 2) of the eject mechanism 81, so that it effects rotation of the crank member 83. The crank member 83 thus rotates until the pin 87 thereon actuates the switch 88 and generates the signal MOT_DET to the auxiliary circuit 76. This signal is applied through the gate 279 to the clock input of flip-flop 278, which loads the flip-flop 279 with a logic low that in turn disables the EJECT output, thereby stopping the motor 82 a short angular distance after the pin 87 has passed the switch 88.

An address decoder 286 is configured to detect an address which corresponds to an ATA bus address of 1F6H when the above-discussed bank register contains a value of 4. Two AND gates 287 and 288, an OR gate 289, and a T-type flip-flop 291 are coupled together in a manner similar to the gates 261–263 and flip-flop 264, except that the gates 287–288 each have an input coupled to the address decoder 286, and have inputs coupled to the line HD1 of the data bus.

The bridge circuit 111 can selectively load the logic level present on line HD1 into the flip-flop 291, in order to control the above-mentioned internal signal MOTOR_RST, which is coupled to the gate 279. Thus, by setting and resetting the flip-flop 291, the bridge circuit 111 can produce a pulse on the line MOTOR_RST, which acts through gate 279 to produce a pulse at the clock input C of flip-flop 278, thereby loading the flip-flop 278 with a logic low state. Thus, the bridge circuit 111 can disable the EJECT line and stop the motor 82, independently of the extent to which actuation of the switch 88 can reset the flip-flop 278 and stop the motor.

An AND gate 296 has two active-low inputs which are respectively coupled to the input terminals CARTINS0 and CARTINS1 of the auxiliary circuit 76. The output of the gate 296 is a signal CARTRIDGE_DETECT internal to the auxiliary circuit 76. As discussed above in association with FIG. 2, if the connector 41 of the cartridge is fully engaged with the connector 42 of the drive module, the signals CARTINS0 and CARTINS1 will each be a logic low. Consequently, the output of the gate 296 will be a logic high in order to indicate that a cartridge has been properly and fully inserted into the drive module. On the other hand, if the connectors 41–42 are not properly engaged, such that either of the signals CARTINS0 and CARTINS1 is not a logic low, then the signal CARTRDIGE_DETECT will be a logic low.

Two AND gates 301 and 302, an OR gate 303, and a T-type flip-flop 304 are coupled together in a manner similar to the gates 287–289 and flip-flop 291, except that line HD3 of the data bus is coupled to inputs of the gates 301–302. The bridge circuit 111 can thus selectively load the logic state on line HD3 of the bus into the flip-flop 304. The normal output Q of the flip-flop 304 is coupled to the reset input R of a D-type flip-flop 307. The D input of flip-flop 307 is coupled to a pull-up resistor 308, so that a logic high is always applied to the D input. The input terminal BUTTON of the auxiliary circuit 76 is coupled through an inverter 309 to the clock input C of the flip-flop 307. The output Q of the flip-flop 307 is a signal BUTTON_REG, which is an internal signal of the auxiliary circuit 76.

When a user presses and releases the eject button 27 (FIG. 1), a pulse is produced at the BUTTON input terminal of the auxiliary circuit 76, and through the inverter 309 this pulse produces a leading edge at the clock input of flip-flop 307, which is then loaded with the logic high present at its D input. This sets the output signal BUTTON_REG of the flip-flop 307 to a logic high. Thus, the flip-flop 307 saves a record of the fact that the eject button 27 has been pressed by the user, even after the user releases the button. This ensures that the bridge circuit 111 will not inadvertently overlook the fact that the eject button 27 has been manually operated, even if the user has already released the button by the time the bridge circuit 111 gets around to checking to see whether the button has been operated. In the disclosed embodiment, the bridge circuit 111 determines whether the eject button 27 has been pressed by reading the state of the BUTTON_REG signal, in a manner discussed later.

Once the bridge circuit 111 has read the BUTTON_REG signal, and finds that it is a logic high to indicate that the eject button has been operated, the bridge circuit 111 needs to reset the flip-flop 307. It does so by successively writing a logic high and then a logic low into the flip-flop 304, which produces a pulse on the BUTTON_RST line that resets the flip-flop 307, thereby forcing it to a logic low.

Two AND gates 316 and 317, an OR gate 318, and a T-type flip-flop 319 are coupled together in a manner similar to the gates 287–289 and flip-flop 291, except that the line HD0 of the data bus is coupled to inputs of the gates 316 and 317. The bridge circuit 111 can thus selectively load the logic state on bus line HD0 into the flip-flop 319. The output of the flip-flop 319 is an internal signal LCSN of the auxiliary circuit 76, which is supplied through a tri-state buffer 322 to the output terminal LCDCSN of the auxiliary circuit 76. The control input of the buffer 322 is coupled to the reset line HRSTN. The buffer 322 is thus disabled during system initialization, but after that is enabled continuously during normal system operation. The bridge circuit 111 can thus selectively set and reset the flip-flop 319 in order to control the chip select signal LCDCSN supplied to the LCD 26 (FIG. 2).

An address decoder 327 is configured to detect an address which corresponds to an ATA address of 1F6H when the above-discussed bank register contains a value of 2. Two AND gates 331 and 332, an OR gate 333, and a T-type flip-flop 334 are coupled together in a manner similar to the gates 287–289 and flip-flop 291, except that the gates 331–332 have inputs coupled to the output of address decoder 327, and the line HD0 of the data bus is coupled to inputs of the gates 331 and 332. The bridge circuit 111 can thus selectively load the logic state present on line HD0 of the bus into the flip-flop 334. The output Q of the flip-flop 334 is an internal signal LDTA of the auxiliary circuit 76, and is coupled through a tri-state buffer 337 to the output terminal LCDDTA of the auxiliary circuit 76. The buffer 337 has its control input coupled to the reset line HRSTN. The buffer 337 is thus disabled during system initialization, but after that is continuously enabled during normal system operation. By selectively setting and resetting the flip-flop 334, the bridge circuit 111 can control the data which is supplied on line LCDDTA to the LCD 26.

Two AND gates 341 and 342, an OR gate 343, and a T-type flip-flop 344 are coupled together in a manner similar to the gates 331–333 and flip-flop 334, except that line HD2 of the data bus is coupled to inputs of the gates 341 and 342. The bridge circuit 111 can thus selectively load the logic state present on the bus line HD2 into the flip-flop 344. The output Q of the flip-flop 344 is coupled through a tri-state buffer 347 to the output terminal LCDWR of the auxiliary circuit 76. The control input of buffer 347 is coupled to the reset line HRSTN. The buffer 347 is thus disabled during system initialization, but after that is continuously enabled during normal system operation. By selectively setting and resetting the flip-flop 344, the bridge circuit 111 can selectively supply pulses to the LCD 26 on the line LCDWR, in order to cause data from the line LCDDTA to be written into the LCD 26.

The auxiliary circuit 76 provides the bridge circuit 111 with the capability to read the state of selected signals within the auxiliary circuit 76. More specifically, and still referring to FIG. 3, an address decoder 371 detects the presence of an ATA bus address of 1F6H. Two four-to-one multiplexers 373 and 374 each have control inputs which are coupled to the three lines DADDR0–DADDR2 from the above-discussed bank register. A selected one of the four inputs of each multiplexer is gated to the output thereof when the bank register respectively contains values of 0, 1, 2 and 4.

The four inputs of the multiplexer 373 are respectively coupled to the internal signal POWR which controls the PWR output terminal, the internal signal CARTRIDGE_DETECT, the internal signal LDTA which controls the output terminal LCDDTA, and the internal signal LCSN which controls the output terminal LCDCSN. The first three inputs of multiplexer 374 are coupled to internal signals which are not needed to understand the present invention, and which thus are not shown in the drawing for purposes of clarity. The remaining input of multiplexer 374 is coupled to the internal signal BUTTON_REG.

The output of multiplexer 373 is a line D0, which is coupled through a tri-state buffer 378 to the line HD0 of the data bus. The output of the multiplexer 374 is a line D2, which is coupled through a tri-state buffer 379 to the line HD2 of the data bus. A three-input AND gate 383 has an output coupled to the control inputs of each of the buffers 378 and 379. The gate 383 has an input coupled to the output of decoder 371, a further input coupled to the signal AOEN which controls the output terminal ATAOEN, and a further active-low input coupled to the bus read control signal IORN. The signal AOEN ensures that the gate 383 is disabled and thus disables the buffers 378–379 when the bus switch 131 is enabled to couple the drive electronics circuit 71 to the ATA bus 122, because the auxiliary circuit 76 is not supposed to put data onto the data bus when the drive electronics circuit 71 is actively coupled to the data bus.

When the gate 383 is enabled, it turns on both of the buffers 378 and 379, so that the currently-selected input of multiplexer 373 is supplied through the buffer 378 to the line HD0 of the data bus, and the currently selected input of the multiplexer 374 is supplied through the buffer 379 to line HD2 of the data bus. The bridge circuit 111 accepts this information from the data bus, and in this manner can obtain the status of various internal signals within the auxiliary circuit 76.

The present invention provides a number of technical advantages. One such technical advantage involves the provision of a removable cartridge that contains a standard hard disk drive mechanism, a cradle that contains a standard drive electronics circuit for controlling the hard disk drive mechanism, and an auxiliary circuit which is inexpensive but which efficiently handles removability issues that permit the hard disk drive mechanism to be electrically decoupled from the drive electronics circuit, even though they are not designed to be decoupled. According to a related feature, the auxiliary circuit does not include a processor, thereby maintaining the auxiliary circuit at a low cost while obtaining suitable functionality.

According to another advantage, the drive electronics circuit is coupled through a bus switch to an ATA bus controlled by a processor. The auxiliary circuit is coupled to the bus, and also operates the bus switch under control of the processor, thereby permitting the processor to interact with the drive electronics circuit when appropriate, and to also interact with the auxiliary circuit in a manner transparent to the drive electronics circuit, in order to handle removability considerations that the drive electronics circuit is not capable of handling.

A related advantage is that, while the drive electronics circuit is carrying out a command of relatively long duration, the processor interacts with the auxiliary circuit across the ATA bus, so that the drive electronics circuit and the auxiliary circuit are effectively operating at the same time. Still another advantage is that the structure and operation of the auxiliary circuit are configured so that the possibility exists for the use of a slave device on the ATA bus.

Still another advantage relates to the fact any one of several pre-existing bridge circuits can be used to interface the ATA bus to a selected one of respective different communication protocols, such as the USB protocol, the IEEE 1394 protocol, the SCSI protocol, the PCMCIA protocol, or some other existing or future protocol. A related advantage is that the processor of each bridge circuit can cooperate with the hardware of the auxiliary circuit in order to handle removability functions, thereby avoiding problems which would be involved in attempting to handle removability considerations using varying hardware configurations of different bridge circuits, while trying to achieve a standardized approach that facilitates interchangeability of the bridge circuits.

Although one embodiment has been illustrated and described in detail, it will be understood that various substitutions and alterations are possible without departing from the spirit and scope of the present invention, as defined by the following claims.

What is claimed is:

1. An apparatus, comprising:
 a cartridge having a data storage section and having a first coupling portion which is operatively coupled to said data storage section; and
 a receiving section that includes:
  a cartridge receiving portion which can removably receive said cartridge;
  a first control circuit;
  a bus controlled by said first control circuit;
  a second control circuit;
  a second coupling portion operatively coupled to said second control circuit and positioned so that said second control circuit can communicate with said data storage section through said first and second coupling portions when said cartridge is removably received in said cartridge receiving portion;
  a bus switch operatively coupled between said bus and said second control circuit, said switch having first and second operational modes in which said switch respectively effects and inhibits an operative coupling of said second control circuit to said bus; and
  an auxiliary circuit operatively coupled to said bus and to said bus switch, said auxiliary circuit being responsive to switch control information received from said first control circuit through said bus for causing said switch to operate in a selected one of said first and second operational modes which is specified by said switch control information.

2. An apparatus according to claim 1, wherein said auxiliary circuit is responsive to a first set of addresses on said bus when said auxiliary circuit is in said first operational mode, and is responsive to a second set of addresses on said bus when said auxiliary circuit is in said second operational mode, said first set being a subset of said second set.

3. An apparatus according to claim 1, wherein said auxiliary circuit is responsive to two successive read operations directed to a selected address on said bus for causing said switch to change from said first operational mode to said second operational mode.

4. An apparatus according to claim 3, wherein said auxiliary circuit is responsive to two successive read operations directed to a selected address on said bus for causing said switch to change from said second operational mode to said first operational mode.

5. An apparatus according to claim 1, wherein said auxiliary circuit includes a cartridge insertion detection section which is coupled to said second coupling portion, which is operable to determine whether said cartridge is removably received in said cartridge receiving portion, and which can be accessed by said first control circuit through said bus.

6. An apparatus according to claim 5,
wherein said first coupling portion includes a first connector having a first terminal which is coupled to ground; and
wherein said second coupling portion includes a second connector having a second terminal which is coupled to said cartridge insertion detection section in said auxiliary circuit, and which is coupled to a source of power through a pull-up resistor, said second connector being physically engaged with said first connector in a manner so that said first and second terminals are in contact when said cartridge is removably received in said cartridge receiving portion.

7. An apparatus according to claim 1,
wherein said receiving section includes a power switch which can be selectively enabled and disabled by said auxiliary circuit; and
wherein when said cartridge is removably received in said cartridge receiving portion, said power switch respectively effects and inhibits a supply of power to said cartridge through said first and second coupling portions when said power switch is respectively enabled and disabled.

8. An apparatus according to claim 7, wherein said auxiliary circuit is responsive to communications received from said first control circuit through said bus for effecting selective enabling and disabling of said power switch.

9. An apparatus according to claim 1,
including a releasable latch mechanism which has a release input coupled to a release output of said auxiliary circuit, and which releasably resists removal of said cartridge from said cartridge receiving section when said cartridge is received in said cartridge receiving section; and
wherein said auxiliary circuit includes release control circuitry for selectively applying to said release input of said latch mechanism a release signal which effects a release of said latch mechanism.

10. An apparatus according to claim 9, wherein said release control circuitry is responsive to communications received from said first control circuit through said bus for generating said release signal.

11. An apparatus according to claim 9, including an eject mechanism which has a control input coupled to said release output of said auxiliary circuit, and which is responsive to said release signal for effecting a selected amount of movement of said cartridge relative to said receiving section in a direction corresponding to removal of said cartridge from said receiving section.

12. An apparatus according to claim 9,
wherein said receiving section includes a manually operable eject button; and
wherein said auxiliary circuit includes a buffering circuit which is coupled to said eject button, which is responsive to manual actuation of said eject button for maintaining an indication that said eject button has been actuated, and which can be accessed by said first control circuit through said bus.

13. An apparatus according to claim 1, wherein said receiving section includes structure for causing said second control circuit to avoid attempting to communicate with said bus when said switch is in said second operational mode, said structure including a pull-up resistor having one end coupled to a source of power and the other end coupled to a line which extends between said bus switch and said second control circuit.

14. An apparatus according to claim 1,
wherein said receiving section includes a display section; and
wherein said auxiliary circuit includes circuitry responsive to communications received from said first control circuit through said bus for controlling information displayed by said display section.

15. An apparatus according to claim 1,
wherein said receiving section has a drive section with a third coupling portion, an interface section with a fourth coupling portion, and a latching mechanism for releasably coupling said interface section to said drive section in a manner so that said drive section and said interface section can communicate through said third and fourth coupling portions;
wherein said drive section includes said receiving section, said second control circuit, said second coupling portion, said bus switch, said auxiliary circuit and a first portion of said bus that extends between said third coupling portion, said bus switch and said auxiliary circuit;
wherein said interface section includes said first control circuit, a second portion of said bus that extends between said fourth coupling portion and said first control circuit, and a port which is coupled to said first control circuit, said first control circuit communicating through said port and through said fourth coupling portion according to respective first and second communication protocols which are different; and
including a further interface section which has a fifth coupling portion and which can be operationally coupled to said drive section in place of said interface section containing said first control circuit, in a manner so that said drive section and said further interface section can communicate through said third and fifth coupling portions, said further interface section including a further port, and including a third control circuit which is coupled to said further port and to said fifth coupling portion, which communicates through said further port according to a third communication protocol, and which communicates through said fifth coupling portion according to said first communication protocol, said third communication protocol being different from each of said first and second communication protocols.

16. An apparatus according to claim 1, wherein said first control circuit is operable to:
cause said second control circuit to initiate a selected procedure when said switch is in said first operational mode;
thereafter change said switch to said second operational mode;
thereafter communicate with said auxiliary circuit;
thereafter change said switch back to said first operational mode; and
thereafter communicate through said switch with said second control circuit.

17. A method of operating an apparatus which includes a receiving section having a cartridge receiving portion that can removably receive a cartridge with a data storage section, said receiving section also having a first control circuit, a bus controlled by said first control circuit, and a second control circuit which can communicate with said data storage section through a coupling portion when said cartridge is removably received in said cartridge receiving portion, said method comprising the steps of:

providing a bus switch operable in first and second operational modes in which said switch respectively effects and inhibits an operative coupling of said second control circuit to said bus; and causing an auxiliary circuit to respond to switch control information provided by said first control circuit through said bus by effecting operation of said switch in a selected one of said first and second operational modes which is specified by said switch control information.

18. A method according to claim 17, including the step of causing said auxiliary circuit to be responsive to a first set of addresses on said bus when said auxiliary circuit is in said first operational mode, and to be responsive to a second set of addresses on said bus when said auxiliary circuit is in said second operational mode, said first set being a subset of said second set.

19. A method according to claim 17, including the step of causing said auxiliary circuit to be responsive to two successive read operations directed to a selected address on said bus for causing said switch to change from said first operational mode to said second operational mode.

20. A method according to claim 17, including the step of causing said auxiliary circuit to be operable to maintain an indication of whether said cartridge is currently received in said cartridge receiving portion, and to allow said indication to be accessed by said first control circuit through said bus.

21. A method according to claim 17, including the step of causing said auxiliary circuit to be responsive to communications received from said first control circuit through said bus for effecting selective enabling and disabling of a power switch to respectively effect and inhibit a supply of power to said cartridge through said coupling portion when said cartridge is removably received in said cartridge receiving portion.

22. A method according to claim 17, including the step of causing said auxiliary circuit to selectively generate a release signal which effects a release of a releasable latch mechanism that releasably resists removal of said cartridge from said cartridge receiving section when said cartridge is received in said cartridge receiving section.

23. A method according to claim 22, including the step of causing said auxiliary circuit to be responsive to communications received from said first control circuit through said bus for effecting said generation of said release signal.

24. A method according to claim 22, including the step of causing an eject mechanism to be responsive to said release signal for effecting a selected amount of movement of said cartridge relative to said receiving section in a direction corresponding to removal of said cartridge from said receiving section.

25. A method according to claim 17, including the step of causing said second control circuit to avoid attempting to communicate with said bus when said switch is in said second operational mode.

26. A method according to claim 17, including the step of causing said first control circuit to be operable to:

cause said second control circuit to initiate a selected procedure when said switch is in said first operational mode;

thereafter change said switch to said second operational mode;

thereafter communicate with said auxiliary circuit;

thereafter change said switch back to said first operational mode; and thereafter communicate through said switch with said second control circuit.

* * * * *